US012013457B2

(12) United States Patent
Urtasun et al.

(10) Patent No.: US 12,013,457 B2
(45) Date of Patent: Jun. 18, 2024

(54) SYSTEMS AND METHODS FOR INTEGRATING RADAR DATA FOR IMPROVED OBJECT DETECTION IN AUTONOMOUS VEHICLES

(71) Applicant: UATC, LLC, Pittsburgh, PA (US)

(72) Inventors: Raquel Urtasun, Toronto (CA); Bin Yang, Toronto (CA); Ming Liang, Toronto (CA); Sergio Casas, Toronto (CA); Runsheng Benson Guo, Toronto (CA)

(73) Assignee: UATC, LLC, Pittsburgh, PA (US)

(*) Notice: Subject to any disclaimer, the term of this patent is extended or adjusted under 35 U.S.C. 154(b) by 581 days.

(21) Appl. No.: 17/150,590

(22) Filed: Jan. 15, 2021

(65) Prior Publication Data

US 2021/0278523 A1    Sep. 9, 2021

Related U.S. Application Data

(60) Provisional application No. 63/133,000, filed on Dec. 31, 2020, provisional application No. 62/985,855, filed on Mar. 5, 2020.

(51) Int. Cl.
*G01S 13/86* (2006.01)
*G01S 7/41* (2006.01)
(Continued)

(52) U.S. Cl.
CPC ............ *G01S 13/865* (2013.01); *G01S 7/417* (2013.01); *G01S 13/589* (2013.01); *G01S 17/89* (2013.01);
(Continued)

(58) Field of Classification Search
None
See application file for complete search history.

(56) References Cited

U.S. PATENT DOCUMENTS 10,539,669 B2  3/2020  Ikram
2018/0364717 A1  12/2018  Douillard et al.
(Continued)

FOREIGN PATENT DOCUMENTS

EP    3525000    8/2019

OTHER PUBLICATIONS

Amin et al, "Understanding Deep Neural Networks Performance for Radar-Based Human Motion Recognition", International Conference on Radar, Aug. 27-30, 2018, Brisbane, Australia, 5 pages.
(Continued)

*Primary Examiner* — Whitney Moore
(74) *Attorney, Agent, or Firm* — Dority & Manning, P.A.

(57) ABSTRACT

Systems and methods for integrating radar and LIDAR data are disclosed. In particular, a computing system can access radar sensor data and LIDAR data for the area around the autonomous vehicle. The computing system can determine, using the one or more machine-learned models, one or more objects in the area of the autonomous vehicle. The computing system can, for a respective object, select a plurality of radar points from the radar sensor data. The computing system can generate a similarity score for each selected radar point. The computing system can generate weight associated with each radar point based on the similarity score. The computing system can calculate predicted velocity for the respective object based on a weighted average of a plurality of velocities associated with the plurality of radar points. The computing system can generate a proposed motion plan based on the predicted velocity for the respective object.

19 Claims, 9 Drawing Sheets

(51) Int. Cl.

| | | |
|---|---|---|
| *G01S 13/58* | (2006.01) | |
| *G01S 17/89* | (2020.01) | |
| *G01S 17/931* | (2020.01) | |
| *G06F 18/22* | (2023.01) | |
| *G06F 18/2433* | (2023.01) | |
| *G06F 18/25* | (2023.01) | |
| *G06N 3/044* | (2023.01) | |
| *G06N 3/045* | (2023.01) | |
| *G06N 20/00* | (2019.01) | |
| *G06V 10/74* | (2022.01) | |
| *G06V 10/80* | (2022.01) | |
| *G06V 10/84* | (2022.01) | |
| *G06V 20/58* | (2022.01) | |

(52) U.S. Cl.
CPC ............ *G01S 17/931* (2020.01); *G06F 18/22* (2023.01); *G06F 18/2433* (2023.01); *G06F 18/251* (2023.01); *G06N 3/045* (2023.01); *G06N 20/00* (2019.01); *G06V 10/761* (2022.01); *G06V 10/803* (2022.01); *G06V 10/84* (2022.01); *G06V 20/58* (2022.01); *G06N 3/044* (2023.01)

(56) References Cited

U.S. PATENT DOCUMENTS

| | | | |
|---|---|---|---|
| 2019/0147335 | A1 | 5/2019 | Wang et al. |
| 2019/0340775 | A1 | 11/2019 | Lee et al. |
| 2020/0202699 | A1* | 6/2020 | Barth ...................... G01S 13/56 |

OTHER PUBLICATIONS

Ba et al, "Layer Normalization", arXiv:1607.06450v1, Jul. 21, 2016, 14 pages.
Barnes et al, "The Oxford Radar Robotcar Dataset: A Radar Extension to the Oxford Robotcar Dataset", arXiv:1909.01300v3, Feb. 26, 2020, 7 pages.
Blom et al, "The Interacting Multiple Model Algorithm for Systems with Markovian Switching Coefficients", Transactions on Automatic Control, vol. 33, No. 8, Aug. 1988.
Caesar et al, "nuScenes: A Multimodal Dataset for Autonomous Driving", arXiv:1903.11027v5, May 5, 2020, 16 pages.
Chadwick et al, "Distant Vehicle Detection Using Radar and Vision", arXiv:1901.10951v2, May 17, 2019, 7 pages.
Chen et al, "Fast Point R-CNN", arXiv1908.02990v2, Aug. 16, 2019, 10 pages.
Chen et al, "Monocular 3D Object Detection for Autonomous Driving", Conference on Computer Vision and Pattern Recognition, Jun. 26-Jul. 1, 2016, Las Vegas, Nevada, pp. 2147-2156.
Chen et al, "Multi-View 3D Object Detection Network for Autonomous Driving", arXiv:1611.07759v3, Jun. 22, 2017, 9 pages.
Cho et al, "A Multi-Sensor Fusion System for Moving Object Detection and Tracking in Urban Driving Environments", International Conference on Robotics and Automation, May 31-Jun. 7, 2014, Hong Kong, China, pp. 1836-1843.
Danzer et al, "2D Car Detection in Radar Data with PointNets", arXiv:1904.08414v3, Dec. 2, 2019, 7 pages.
Gohring et al, Radar/Lidar Sensor Fusion for Car-Following on highways. In: The 5th International Conference on Automation, Robotics and Applications, Jul. 27-29, 2011, Chicago, Illinois, United States, 6 pages.
Gurbuz et al, "Radar-Based Human-Motion Recognition with Deep Learning: Promising Applications for Indoor Monitoring", Signal Processing Magazine vol. 36, No. 4, Jul. 2019, pp. 16-28.
Hajri et al, "Real Time Lidar and Radar High-Level Fusion for Obstacle Detection and Tracking with Evaluation on a Ground Truth", arXiv:1807.11264v2, Jul. 1, 2019, 7 pages.
He et al, "Identity Mappings in Deep Residual Networks", arXiv:1603.05027v3, Jul. 25, 2016, 15 pages.

Ioffe et al, "Batch Normalization: Accelerating Deep Network Training by Reducing Internal Covariate Shift", arXiv:1502.03167v3, Mar. 2, 2015, 11 pages.
John et al, "RVNet: Deep Sensor Fusion of Monocular Camera and Radar for Image-Based Obstacle Detection in Challenging Environments", Pacific-Rim Symposium on Image and Video Technology, Nov. 18-22, 2019, Sydney, Australia, 14 pages.
John et al, "SO-Net: Joint Semantic Segmentation and Obstacle Detection Using Deep Fusion of Monocular Camera and Radar", Pacific-Rim Symposium on Image and Video Technology, Nov. 18-22, 2-19, Sydney, Australia, 10 pages.
Kellner et al, "Grid-Based DBSCAN for Clustering Extended Objects in Radar Data", Intelligent Vehicles Symposium, Jun. 3-7, 2012, Alcala de Henares, Spain, 6 pages.
Kim et al, "Moving Target Classification in Automotive Radar Systems Using Convolutional Recurrent Neural Networks", European Signal Processing Conference, Sep. 3-7, 2018, Rome, Italy, pp. 1496-1500.
Kingma et al, "Adam: A Method for Stochastic Optimization", arXiv:1412.6980v9, Jan. 30, 2017, 15 pages.
Ku et al, "Joint 3D Proposal Generation and Object Detection from View Aggregation", arXiv:1712.02294v4, Jul. 12, 2018, 8 pages.
Kuang et al, "Multi-Modality Cascaded Fusion Technology for Autonomous Driving", arXiv:2002.03138v1, Feb. 8, 2020, 8 pages.
Lang et al, "PointPillars: Fast Encoders for Object Detection from Point Clouds", arXiv:1812.05784v2, May 7, 2019, 9 pages.
Lee et al, Geometric Model Based 2D LiDAR/Radar Sensor Fusion for Tracking Surrounding Vehicles, Science Direct, 2019, pp. 130-135.
Li et al, "3D Fully Convolutional Network for Vehicle Detection in Point Cloud", arXiv:1611.08069v2, Jan. 16, 2017, 5 pages.
Li et al, "Vehicle Detection from 3D Lidar using Fully Convolutional Network", arXiv:1608.07916v1, Aug. 29, 2016, 8 pages.
Li et al, High Resolution Radar-Based Occupancy Grid mapping and Free Space Detection, Conference on Vehicle Technology and Intelligent Transport System, Mar. 16-18, 2018, Funchal, Madeira, Portugal, pp. 70-81.
Lim et al, "Radar and Camera Early Fusion for Vehicle Detection in Advanced Driver Assistance Systems", Conference on Neural Information Processing Systems, Dec. 8-14, 2019, Vancouver, Canada, 11 pages.
Lin et al, "Feature Pyramid Networks for Object Detection", arXiv:1612.03144v2, Apr. 19, 2017, 10 pages.
Lin et al, "Focal Loss for Dense Object Detection", arXiv:1708.02002v2, Feb. 7, 2018, 10 pages.
Lombacher et al., "Potential of Radar for Static Object Classification using Deep Learning Methods", International Conference on Microwaves for Intelligent Mobility, May 19-20, 2016, 4 pages.
Lombacher et al, "Semantic Radar Grids", Intelligent Vehicle Symposium, Jun. 11-14, 2017, Redondo Beach, California, United States, pp. 1170-1175.
Meyer et al, "Automotive Radar Dataset for Deep Learning Based 3D Object Detection", European Radar Conference, Oct. 2-4, 2019, Paris, France, 4 pages.
Meyer et al, "Deep Learning Based 3D Object Detection for Automotive Radar and Camera", European Radar Conference, Oct. 2-4, 2019, Paris, France, pp. 133-136.
Meyer et al, "LaserNet: An Efficient Probabilistic 3D Object Detector for Autonomous Driving", arXiv:1903.08701v1, Mar. 20, 2019, 10 pages.
Nabati et al, "RRPN: Radar Region Proposal Network for Object Detection in Autonomous Vehicles", arXiv:1905.00526v2, May 15. 2019, 5 pages.
Nobis et al, "A Deep Learning Based Radar and Camera Sensor Fusion Architecture for Object Detection", arXiv:2005.07431v1, May 15, 2020, 7 pages.
Patel et al, "Deep Learning-Based Object Classification on Automotive Radar Spectra", Radar Conference, Apr. 22-26, 2019, Boston, Massachusetts, United States, 6 pages.
Qi et al, "Frustum PointNets for 3D Object Detection from RGB-D Data", arXiv:1711.08488v2, Apr. 13, 2018, 15 pages.

(56) References Cited

OTHER PUBLICATIONS

Schumann et al, "Semantic Segmentation on Radar Point Clouds", Conference on Information Fusion. Jul. 10-13, 2018, Cambridge, United Kingdom, 8 pages.
Seyfioglu et al, "DNN Transfer Learning from Diversified Micro-Doppler for Motion Classification", arXiv:1811.08361v1, Nov. 20, 2018, 15 pages.
Shi et al, "PointRCNN: 3D Object Proposal Generation and Detection from Point Cloud", arXiv:1812.04244v2, May 16, 2019, 10 pages.
Simonelli et al, "Disentangling Monocular 3D Object Detection", arXiv:1905.12365v1, May 29, 2019, 15 pages.
Skolnik, "Radar Handbook", Second Edition, 1990, 846 pages.
Sless et al, "Road Scene Understanding by Occupancy Grid Learning from Sparse Radar Clusters using Semantic Segmentation", arXiv:1904.00415v2, Sep. 2, 2019, 9 pages.
Sun et al, "Multi-Sensor Optimal Information Fusion Kalman Filter", Automatica, vol. 40, No. 6. 2004, pp. 1017-1023.
Szegedy et al, "Going Deeper with Convolutions", arXiv:1409.4842v1, Sep. 17, 2014, 12 pages.
Weng et al, "Monocular 3D Object Detection with Pseudo-Lidar Point Cloud", arXiv:1903.09847V4, Aug. 31, 2019, 14 pages.
Wohler et al, "Comparison of Random Forest and Long Short-Term Memory Network Performances in Classification Tasks Using Radar", Sensor Data Fusion: Trends, Solutions, Applications, Oct. 10-12, 2017, Bonn, Germany, 6 pages.
Yan et al, "SECOND: Sparsely Embedded Convolutional Detection", Sensors, Oct. 6, 2018, 17 pages.
Yang et al, "HDNET: Exploiting HD Maps for 3D Object Detection", arXiv:2012.11704v1, Dec. 21, 2020, 10 pages.
Yang et al, "PIXOR; Real-Time 3D Object Detection from Point Clouds", arXiv:1902.06326v3, Mar. 2, 2019, 10 pages.
Yang et al, "STD: Sparse-to-Dense 3D Object Detector for Point Cloud", arXiv:1907.10471v1, Jul. 22, 2019, 9 pages.
Zhou et al, "End-to-End Learning for Point Cloud Based 3D Object Detection", arXiv:1711.06396vl, Nov. 17, 2017, 10 pages.
Zhu et al, "Class-Balanced Grouping and Sampling for Point Cloud 3D Object Detection" arXiv:1908.09492v1, Aug. 26, 2019, 8 pages.
International Search Report and Written Opinion for Application No. PCT/US2021/020638, mailed Jun. 24, 2021, 14 pages.

* cited by examiner

SYSTEMS AND METHODS FOR INTEGRATING RADAR DATA FOR IMPROVED OBJECT DETECTION IN AUTONOMOUS VEHICLES

RELATED APPLICATION

This application claims priority to and the benefit of U.S. Provisional Patent Application No. 62/985,855, filed Mar. 5, 2020 and U.S. Provisional Patent Application No. 63/133,000, filed Dec. 31, 2020 which are hereby incorporated by reference in their entirety.

FIELD

The present disclosure relates generally to autonomous vehicles. More particularly, the present disclosure relates to path planning in autonomous vehicles.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include accessing, by a computing system including one or more processors, radar sensor data for an area around an autonomous vehicle, the radar sensor data including a plurality of radar points. The method can include accessing, by the computing system, LIDAR sensor data for the area around the autonomous vehicle. The method can include generating, by the computing system using one or more machine-learned models, a fused representation of the area around the autonomous vehicle based on the radar sensor data and the LIDAR sensor data. The method can include determining, by the computing system using the one or more machine-learned models, one or more objects in the area of the autonomous vehicle based on the fused representation. The method can include, for a respective object in the one or more objects, selecting a plurality of radar points from the radar sensor data. The method can include generating, by the computing system using a machine-learned model, a similarity score for each selected radar point. The method can include generating, by the computing system, a weight associated with each radar point based, at least in part, on the similarity score. The method can include calculating a predicted velocity for the respective object based on a weighted average of a plurality of velocities associated with the plurality of radar points. The method can include generating, by the computing system, a proposed motion plan based on the predicted velocity for the respective object.

Another example aspect of the present disclosure is directed to a computing system. The computing system can include one or more processors and one or more non-transitory computer-readable memories, wherein the one or more non-transitory computer-readable memories store instructions that, when executed by the processor, cause the computing system to perform operations. The operations can include accessing radar sensor data for an area around an autonomous vehicle, the radar sensor data including a plurality of radar points. The operations can include accessing LIDAR sensor data for the area around the autonomous vehicle. The operations can include generating, using one or more machine-learned models, a fused representation of the area around the autonomous vehicle based on the radar sensor data and the LIDAR data. The operations can include determining, using the one or more machine-learned models, one or more objects in the area of the autonomous vehicle based on the fused representation. The operations can include, for a respective object in the one or more objects, selecting a plurality of radar points from the radar sensor data. The operations can include generating, using a machine-learned model, a similarity score for each selected radar point. The operations can include generating a weight associated with each radar point based on the similarity score. The operations can include calculating a predicted velocity for the respective object based on a weighted average of the velocities associated with the plurality of radar points. The operations can include generating a proposed motion plan based on the predicted velocity for the respective object.

Yet another example aspect of the present disclosure is directed to an autonomous vehicle. The autonomous vehicle can access radar sensor data for an area around an autonomous vehicle, the radar sensor data including a plurality of radar points. The autonomous vehicle can access LIDAR sensor data for the area around the autonomous vehicle. The autonomous vehicle can generate, using one or more machine-learned models, a fused representation of the area around the autonomous vehicle based on the radar sensor data and the LIDAR data. The autonomous vehicle can determine, using the one or more machine-learned models, one or more objects in the area of the autonomous vehicle based on the fused representation. The autonomous vehicle can, for a respective object in the one or more objects, select a plurality of radar points from the radar sensor data. The autonomous vehicle can generate, using a machine-learned model, a similarity score for each selected radar point. The autonomous vehicle can generate a weight associated with each radar point based on the similarity score. The autonomous vehicle can calculate a predicted velocity for the respective object based on a weighted average of the velocities associated with the plurality of radar points. The autonomous vehicle can generate a proposed motion plan based on the predicted velocity for the respective object.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
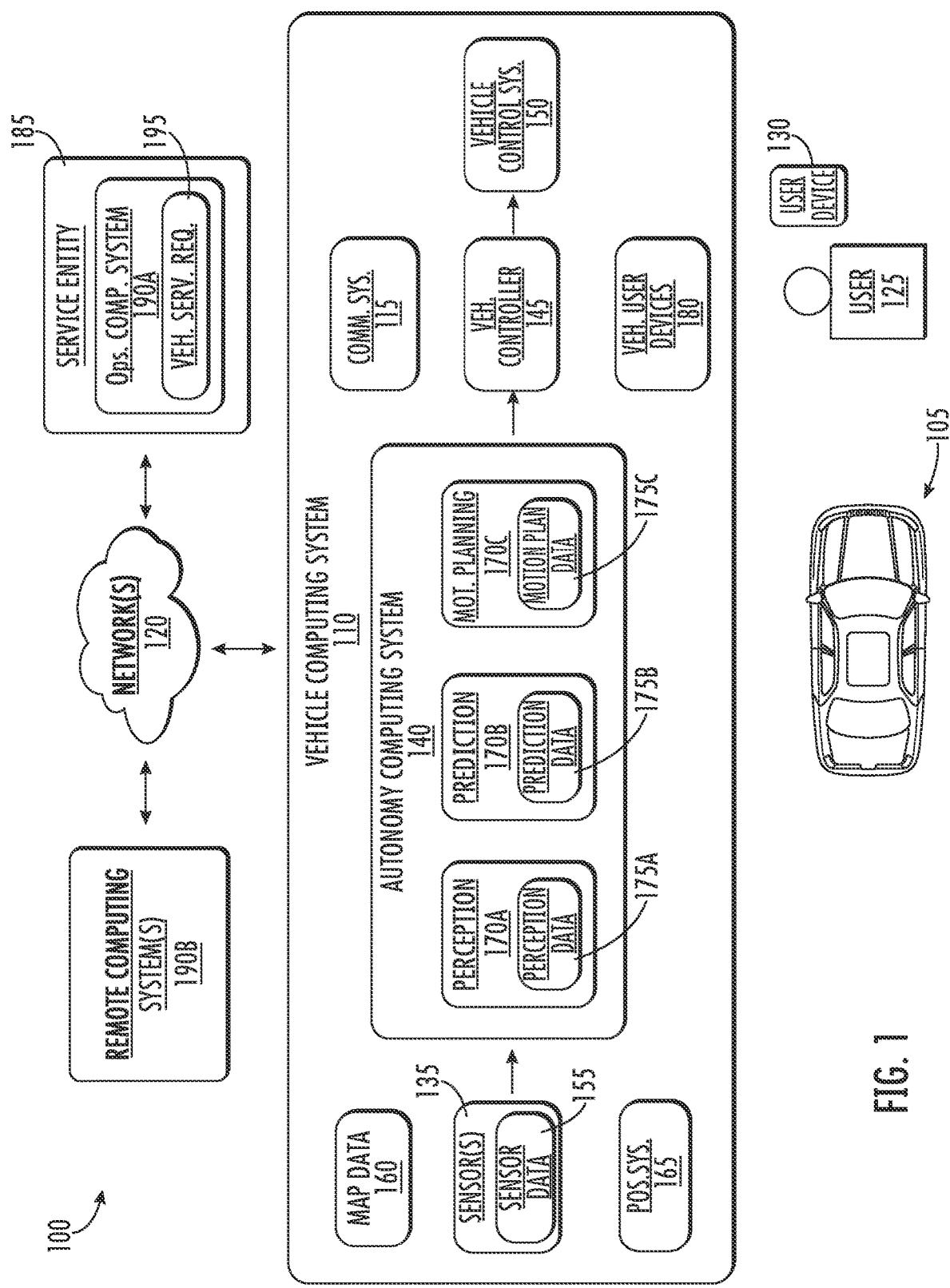
FIG. 1 depicts a block diagram of an example autonomous vehicle according to example embodiments of the present disclosure.

Generally, the present disclosure is directed towards a technology for object detection by integrating radar data and LIDAR data to perform the perception function of an autonomous system such as, for example, an autonomous vehicle. An autonomous vehicle can include multiple sensors, including, but not limited to LIDAR sensors and radar sensors. Each sensor type gathers different information for the environment around the sensor. For example, a LIDAR sensor (e.g., a 360-degree rotating LIDAR sensor, etc.) gathers point cloud data for the area around the sensor and/or the autonomous vehicle. The area around the autonomous vehicle can include a field of view of at least one of the vehicle's sensors. The point cloud data can include a plurality of points, each point representing laser light produced by a laser, reflected back from an object, and measured by a sensor. Each point can have an associated position in the area of the LIDAR sensor (e.g., with an associated coordinate with x, y, and z values) and, potentially, a luminance value. Radar data can include a plurality of radar points, each with an associated position (e.g., a two-dimensional coordinate) and a velocity estimation. An autonomous vehicle can use both LIDAR data and radar data to improve the perception function of the autonomous vehicle.

The perception function of the autonomous vehicle can be performed by a vehicle computing system associated with the autonomous vehicle. The vehicle computing system can access LIDAR point cloud data and radar point data. The LIDAR point cloud data can include data obtained during a plurality of sensor sweeps. Each sensor sweep can represent a full revolution of the LIDAR sensor as the autonomous vehicle moves along a path. Thus, each sweep represents a different time step between a point in the past and the most recent sweep (effectively the current time). The radar point data can include multiple cycles as well. Each cycle can represent a single instance of the radar transmitting radio waves and sense those waves being reflected back off objects. The LIDAR point cloud data and the radar point data can be organized and represented as voxel grid representations. For example, the area associated with the LIDAR point cloud data can be subdivided into a plurality of voxels (e.g., three-dimensional portions of the total area) and each voxel can be assigned a value representing the number of points that fall into that voxel and their average distance from the sensor.

The vehicle computing system can leverage machine-learning technology to analyze the voxel grid representation(s). For instance, the vehicle computing system can, using one or more machine-learned models, extract feature information from the voxel grid representation of the LIDAR point cloud data and the radar point data. In some examples, feature data can include low-level information about the point cloud data and the radar points, including information about edges, corners, blobs, and so on. The vehicle computing system can fuse the feature data from the voxel grid representation of the LIDAR point cloud data and the voxel grid representation of the radar point data to create a fused voxel grid representation, with each voxel in the grid including feature data from both the LIDAR point cloud voxel representation grid and the voxel grid representation for the radar data. The vehicle computing system can, using one or more machine-learned models, identify one or more objects based on the fused voxel grid representation. The detected objects can be represented in a bird's eye view (BEV) representation. Each object can be assigned an estimated velocity.

As examples, the one or more machine-learned models can be or can otherwise include various machine-learned models such as, for example, neural networks (e.g., deep neural networks), support vector machines, convolutional neural networks (e.g., dual-head convolutional neural network(s), etc.), decision trees, ensemble models, k-nearest neighbors models, Bayesian networks, or other types of models including linear models, and/or non-linear models. Example neural networks include multi-layer perceptron networks, feed-forward neural networks, recurrent neural networks (e.g., long short-term memory recurrent neural networks), convolutional neural networks, or other forms of neural networks.

The vehicle computing system can, for each object, determine a set of radar points that are associated with it. In some examples, the set of radar points associated with an object can include all radar points in the radar point data. In other examples, the vehicle computing system can filter the plurality of radar points such that only radar points within a predetermined distance are determined to be associated with a particular object. In yet other examples, the vehicle computing system can determine that each point is associated with only the object whose estimated center is closest to it.

The vehicle computing system can canonicalize the velocities associated with each radar point such that the velocity for each radar point is parallel to an estimated direction of motion for the object. In some examples, the estimated direction of travel is determined by the vehicle computing system based on the change of position of the object through subsequent sweeps of the LIDAR data or subsequent cycles of the radar data. To generate a velocity that is parallel to the direction of travel, the vehicle computing system can deconstruct velocities associated with radar points into two or more components and select the component velocity that is parallel to the estimated direction of travel for the respective object.

The vehicle computing system can, for each radar point associated with a respective object, generate a similarity score between the object and the radar point. The similarity score can be based on a number of factors including location and estimated velocity. Each object/radar point pair can be input to a multi-layer perceptron which can output a pairwise similarity score. The similarity scores can be normalized (e.g., adjusted such that they sum to 1). The normalized similarity scores can be used as a weight and combined with the velocity of each point to produce a weighted velocity. The weighted velocities for the determined radar points can be combined into a weighted average velocity. This weighted average velocity can be stored as the estimated velocity for the object and used in the prediction and motion planning functions of the autonomous vehicle. This can improve the accuracy of the vehicle's perception function as well as the downstream motion prediction and motion planning functions. Accordingly, the technology described herein can improve the computing performance of the vehicle's onboard system while also improving how the vehicle safely operates within its environment.

The following describes the technology of this disclosure within the context of an autonomous vehicle for example purposes only. As described herein, the technology described is not limited to autonomous vehicles and can be implemented within other robotic and computing systems, such as those tasked with perceiving an environment of the robot and/or computing system.

An autonomous vehicle can include a vehicle computing system that performs the perception functions described above. The vehicle computing system can also be responsible for, among other functions, creating the control signals needed to effectively control an autonomous vehicle. The vehicle computing system can include an autonomy computing system. The autonomy computing system can include one or more systems that enable the autonomous vehicle to plan and/or follow a given route, receive sensor data about the environment, perceive objects within the vehicle's surrounding environment (e.g., other vehicles), predict the motion of the objects within the surrounding environment, and generate trajectories for the vehicle to follow based on the route/perceived objects/predicted object motion. The autonomy system can output data indicative of the generated trajectories and corresponding control signals can be sent to vehicle control system(s) (e.g., acceleration, steering, braking, etc. systems) to enable the autonomous vehicle to autonomously navigate (e.g., to its target destination).

The computing system of an autonomous vehicle can include a plurality of devices (e.g., physically-connected devices, wirelessly-connected devices, virtual devices running on a physical machine, etc.) that implement a software graph architecture of the autonomous vehicle. For instance, the computing devices can implement the vehicle's autonomy software that helps allow the vehicle to autonomously operate within its environment.

To accomplish these operations, the autonomy computing system can include, for example, a perception system, a prediction system, and a motion planning system. Many of the functions performed by the perception system, prediction system, and motion planning system can be performed, in whole or in part, by one or more machine-learning models. Moreover, one or more of the perception system, the prediction system, and/or the motion planning system (or the functions associated therewith) can be combined into a single system and/or share computing resources.

To help maintain awareness of the vehicle's surrounding environment, the vehicle computing system can access sensor data from one or more sensors (e.g., LIDAR, RADAR, camera, etc.) to identify static objects and/or dynamic objects (actors) in the autonomous vehicle's environment. To help determine its position within the environment (and relative to these objects), the vehicle computing system can provide sensor data to a machine-learned model(s). In addition or alternatively, the autonomous vehicle can access map data (e.g., high-definition map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system can utilize the sensor data to identify one or more objects in the local environment of the autonomous vehicle. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system can use the perception data to generate predictions for the movement of one or more objects as an object trajectory including one or more future coordinates/points. In some implementations, the perception and prediction functions of the vehicle computing system can be included within the same system. The vehicle computing system can use the perception data, prediction data, map data, and/or other data to generate a motion plan for the vehicle.

More specifically, the vehicle computing system can use a sensor data integration system to use sensor data from both the LIDAR and the radar to accurately perceive objects in the environment of the autonomous vehicle. For example, the sensor data integration system can include a feature extraction system, an object identification system, an association system, and a velocity estimation system.

The feature extraction system can obtain sensor data from two or more sensors in the autonomous vehicle. Specifically, the feature extraction system can access point cloud data from a LIDAR system. The point cloud data includes a plurality of points, each point associated with a position in three-dimensional space defined by a set of coordinates (e.g., x, y, and z coordinates). In some examples, each point can have luminance data associated with it (e.g., how strong, or bright was the reflected laser light when it was sensed by the LIDAR sensor) and a confidence value, the confidence value representing the degree to which the system is confident that the point represents an object.

The feature extraction system can also access radar point data. The radar point data can include a plurality of radar points. Each radar point can have a position defined by coordinate values and an associated velocity. The velocity can be determined (or estimated) by measuring the doppler shift associated with one or more reflected radar waves. Note that some radar systems do not include the ability to distinguish height so the position associated with a particular radar point can be limited to a two-dimensional x, y coordinate rather than a three-dimensional x, y, z coordinate.

The feature extraction system can arrange the sensor data produced by the LIDAR sensor and the radar sensor into a voxel grid representation. Thus, for the point cloud data produced by the LIDAR, the three-dimensional space in which the point cloud data exists can be divided into a plurality of subsections. In general, each subsection can be the same size. In addition, the point cloud data can include data produced by a plurality of sweeps of the LIDAR sensor (each sweep representing a complete rotation of the sensor) representing a period of time (e.g., all the sweeps that occur in a 0.5 second time period). In addition, the voxel grid representation can include a plurality of channels, each channel representing a separate sweep and thus being associated with a particular point in time. Thus, each channel can represent a full voxel grid representation for a particular period of time. Comparing several channels can allow the sensor data integration system as a whole to estimate the movement of objects within the area of the autonomous vehicle.

In addition, because the LIDAR sensor sweeps or radar cycles are generated by sensors attached to an autonomous vehicle, as the autonomous vehicle moves, the coordinate frame of the sensor data (both LIDAR and radar) included in each sensor sweep (or radar cycle) changes. For example, a stationary mailbox may appear in front of the autonomous vehicle in a sensor sweep or radar cycle associated with the current time but beside or behind the autonomous vehicle in a future sensor sweep (or radar cycle) as the autonomous vehicle moves past the mailbox. As such, the vehicle computing system can transform the LIDAR point cloud data or radar point data into a common coordinate frame (e.g., the current coordinate frame).

In some examples, the voxel grid representation can cover a geographic area that has been subdivided into a plurality of equally-sized cubes. Voxels for the voxel grid representation of the LIDAR point cloud data can, for each voxel, include a scalar value representative of the number of points in the point cloud data in the voxel. As such, the scalar value can be a representation of density and be weighted based on the average distance of the points in the voxel from the sensor itself. Thus, this scalar value can be a distance-weighted density feature.

Similarly, the voxel grid representation of the radar point data can include, for each voxel, a scalar value that represents the number of radar points in the voxel (density) that is weighted based on the average distance of each radar point to the center of the voxels (e.g., the location of the sensor). It is worth noting that the voxel grid representation of the radar point data may differ from the voxel grid representation for the LIDAR data because, for at least some types of radar sensors, the vertical position of a given radar point is not determined by the sensor and thus, the voxel grid representation does not include a height dimension. In addition, radar points that have no associated movement values may be filtered out. These radar points may be filtered out because they may be associated with background features not/less relevant to the perception function.

The feature extraction system can use the voxel grid representation of the LIDAR data as input to one or more machine-learned models. The one or more machine-learned models can identify feature data from the voxel grid representation of the LIDAR data. In some examples, feature data can include low level information about the LIDAR point cloud data and the radar points, including information about edges, corners, blobs, and so on. In other examples, the feature data can be non-interpretable (e.g., the models produce feature data that is used as input to other machine-learned models but is unintelligible to a human viewer). The voxel grid representation of the radar point data can be used as input to one or more machine-learned models and feature data can be generated for the voxel grid representation of the radar point data.

The resulting output can be a feature map representation for the LIDAR point cloud data and a feature map representation for the radar point data. A feature map representation can be a grid of values, associated with the LIDAR data or the radar data. Each value in the grid of values can be associated with a voxel in a voxel grid representation for the associated sensor data type and having associated feature data and representing a particular area.

The feature extraction system can fuse the feature map representation resulting from the LIDAR point cloud data with the feature map representation resulting from the radar point data. In some examples, fusing the two map representations can include concatenating the feature data from both feature map representations and including the concatenated feature data in the fused representation.

The fused representation can be passed to the object identification system. The object identification system can use a backbone network to extract multi-scale feature data from the fused representation. The backbone network can use one or more machine-learned models to generate a feature map for the fused representation. The feature map can represent the data in a bird's eye view (BEV) of the area.

The object identification system can use the feature map as input to a machine-learned model that has been trained to output data identifying one or more objects in the area around the autonomous vehicle. For example, the area around an autonomous vehicle can include a rectangular area extending 100 meters in front of and behind the autonomous vehicle and extending 25 meters to each side. The machine-learned models can output a list of detected objects. Each object can be represented by data including the category associated with the object, the location of the object (in coordinates (e.g., x y coordinates relative to the location of the autonomous vehicle), the 2-D center position of the object within the area, in BEV, the width and length of the object, the object orientation (e.g., the direction the object is facing), a binary label indicates whether the object is moving or not, and the 2-D estimated velocity (e.g., values for the velocity representing an x-component of the velocity and a y-component of the velocity). In some examples, each object has an associated confidence score representing the likelihood that the object exists at its predicted location. The object identification system can filter out objects with confidence scores that are below a threshold confidence value. This filtering step can be referred to as non maximum suppression (NMS).

The sensor data integration system can pass the list of objects and the radar point data to the association system. The association system can generate weighted velocity estimates for a plurality of radar points for each object. To do so, the association system can identify a plurality of radar points for a particular object. In some examples, the association system can select radar points within a particular distance of the object. In other examples, the association system can select all radar points in the radar point data. For a respective object, the association system can canonicalize the velocities for the selected radar points. Canonicalizing the velocities for a particular radio point includes identifying the object direction for the respective object. The object direction can be generated during the object detection described above. The association system can calculate a velocity for the point that is parallel to the direction of the respective object.

To do so, the association system can generate a parallel velocity $v^{bp}$, such that:

$$v^{bp} = \min\left(50, \frac{V_\parallel}{\cos(\gamma)}\right)$$

wherein $v_\parallel$ is the original velocity of the radar point and $$\gamma = \arccos\frac{|v \cdot p|}{\|v\| \cdot \|p\|}$$

is the angle between object velocity vector v and radial direction p. This also caps the velocity at 50 m/s to avoid extremely large values that are not realistic.

The association system can generate a similarity score between the respective object and each radar point in the plurality of selected radar points by using pairwise feature data as input to a matching function. The pairwise feature data for a particular object (D) and a particular radar point Q can be $$f(D,Q) = (f^D, f^{DQ})$$

where $$f^D = \left(w, h, \|v\|, \frac{v_x}{\|v\|}, \frac{v_y}{\|v\|}, \cos(\gamma)\right)$$

$$f^{DQ} = (dx, dy, dt, v^{bp})$$

wherein w and h are the width and height of the object, v is the object velocity vector, $v_x$ and $v_y$ are x and y components of the velocity, and $d_x$, $d_y$, $d_t$ are the offsets between center locations and timestamps of radar point and the object.

The matching function can be parameterized using a multi-layer perceptron (MLP) network such that the similarity score ($s_{i,j}$) is defined by $$s_{i,j} = \text{MLP}_{match}((f(D_i, Q_j))$$

The similarity scores can be used by the velocity estimation system to generate an estimated velocity for the respective object. To do so, the velocity estimation system can normalize the similarity scores. Normalizing the similarity scores can include scaling the similarity scores such that the sum of all the scores is equal to one, while the value of the scores relative to each other would remain the same. Thus, if a first similarity score were double the value of a second similarity score before the values were normalized, that ratio would remain after normalization. If the similarity score for a particular radar point is below a threshold value, the normalization process may result in that value being assigned a weighted value of zero. In this way, radar points that are too far away from the object or have velocities that are directed away from the direction of travel of the object do not affect the estimated velocity for that object.

Once the similarity scores have been normalized, the normalized similarity scores can be used as weighting factors for combining the velocities of the radar points associated with the similarity scores. The velocity estimation system can generate an estimated velocity of the object by weighting the velocities associated with each radar point and averaging the weighted velocities. For example, if three radar points have similarity scores such that the similarity score of point 1 is 60, the similarity score of point 2 is 30, and the similarity score of point 3 is 10, the normalized values for these points would be 0.6, 0.3, and 0.1, respectively.

Continuing with this example, if the velocity associated with point 1 is 10 m/s, the velocity associated with point 2 is 30 m/s, and the velocity associated with point 3 is 12, the weighted scores would be weighted velocities would be 6 m/s, 9 m/s, and 1.2 m/s respectively, resulting in an estimated velocity for the object of 16.2 m/s.

The estimated velocity can be assigned to the respective object and the value can be stored for use by the prediction and motion planning functions of the vehicle computing system. For example, the vehicle computing system can use the estimated velocities, along with other information, to generate motion plans which are then executed by the autonomous vehicle.

The following provides an end-to-end example of the technology described herein. An autonomous vehicle can include a vehicle computing system. The vehicle computing system can access radar sensor data for an area around an autonomous vehicle, the radar sensor data including a plurality of radar points. In some examples, the radar sensor data includes, for each radar point, a coordinate designating a location of the radar point and a velocity associated with the radar point. The coordinate for a particular radar point can be defined based on a coordinate frame of the radar sensor at its current position.

In some examples, the radar sensor data includes data from a plurality of cycles of the radar sensor. Each cycle can represent a period of time in which the radar sensor collects data. In some examples, the number of cycles included in radar sensor data can be based on the amount of time in which those cycles of data are captured. Thus, the vehicle computing system can gather all radar sensor data captured by cycles that occurred in the past 0.5 seconds.

In some examples, the vehicle computing system can filter the radar sensor data to remove radar points that have an associated velocity value below a predetermined threshold. For example, radar points that are static (e.g., have no velocity) may be associated with very distant objects that are not of interest to the vehicle computing system and are thus filtered from the data set.

The vehicle computing system can access LIDAR sensor data for the area around the autonomous vehicle. In some examples, the LIDAR sensor data includes a plurality of LIDAR points, each LIDAR point having an associated location. The location can be defined by a three-dimensional coordinate. For example, the point can have an associated x value, y value, and z value. In some examples, the LIDAR sensor data includes data from a plurality of sweeps of the LIDAR sensor. As with the radar cycles, the system can include all the sensor sweeps that occurred within a given period of time (e.g., the most recent 0.5 second time period).

The vehicle computing system can generate, using one or more machine-learned models, a fused representation of the area around the autonomous vehicle based on the radar sensor data and the LIDAR sensor data. To do so, the vehicle computing system can generate a voxel grid representation of the radar sensor data and a voxel grid representation of the LIDAR sensor data.

In some examples, the voxel grid representation of the radar sensor data can include a plurality of voxels. In some examples, each voxel can be associated with a voxel occupancy value. The voxel occupancy value for a respective voxel can be based on a number of radar points that fall within the area associated with the respective voxels. The vehicle computing system can identify, using the voxel grid representation of the radar sensor data as input to one or more machine-learned models, feature data for the radar sensor data. The vehicle computing system can identify, using the voxel grid representation of the LIDAR sensor data as input to one or more machine-learned models, feature data for the LIDAR sensor data.

In some examples, the vehicle computing system can concatenate feature data associated with the radar sensor data and the feature data associated with the LIDAR sensor data and associating the concatenated data with a corresponding point in the fused representation.

The vehicle computing system can determine, using the one or more machine-learned models, one or more objects in the area of the autonomous vehicle based on the fused representation. The vehicle computing system can determine, for each identified object, a location for the center of the object and a direction of movement. This can be determined by comparing the position of the object in a first time sweep to the position of the object in a second time sweep.

The vehicle computing system can, for a respective object in the one or more objects, select a plurality of radar points from the radar sensor data. In some examples, the vehicle computing system can determine, for each radar point in the plurality of radar points, a distance from the radar point to a point associated with the respective object. The vehicle computing system can select one or more radar points based on a determined distance between each radar point and a point associated with the respective object. For example, the vehicle computing system can associate radar points with the object closest to them. In some examples, the point associated with the respective object is an estimated center of the object.

The vehicle computing system can generate, using a machine-learned model, a similarity score for each selected radar point. In some examples, the respective object has an estimated direction. The similarity score can be based, at least in part, on the similarity of the velocity associated with a particular radar point and the estimated direction of the object.

The vehicle computing system can generate a weight associated with each radar point based on the similarity score. To do so, the vehicle computing system can normalize the weights associated with the plurality of radar points. The vehicle computing system can generate a weight associated with each radar point based on the similarity score. In some examples, the vehicle computing system can generate, for a particular radar point, a modified velocity value based on the estimated direction of the respective object and the velocity associated with the radar point. In some examples, the modified velocity value is parallel to the estimated direction of the respective object.

The vehicle computing system can calculate a predicted velocity for the respective object based on a weighted average of a plurality of velocities associated with the plurality of radar points. The vehicle computing system can generate a proposed motion plan based on the predicted velocity for the respective object. Note that, when the term "based on" is used herein, the disclosure includes both situations in which a result is based totally on the stated factor and also situations in which a result is based only in part on the stated factor.

Various means can be configured to perform the methods and processes described herein. For example, a computing system can include data obtaining units(s), fusion units(s), detection units(s), association unit(s), estimation unit(s), planning unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access radar sensor data for an area around an autonomous vehicle, the radar sensor data and LIDAR sensor data for the area around the autonomous vehicle. For example, a vehicle computing system can receive sensor data from a LIDAR sensor and a radar sensor. A data obtaining unit is one example of a means for accessing radar sensor data and LIDAR sensor data for the area around the autonomous vehicle.

The means can be configured to generate, using one or more machine-learned models, a fused representation of the area around the autonomous vehicle based on the radar sensor data and the LIDAR data. For example, a machine-learned model can be trained to accept LIDAR and radar data as input and to output a fused feature map of the area around the autonomous vehicle. A fusion system is one example of a means for generating, using one or more machine-learned models, a fused representation of the area around the autonomous vehicle based on the radar sensor data and the LIDAR data.

The means can be configured to determine, using the one or more machine-learned models, one or more objects in the area of the autonomous vehicle based on the fused representation. For example, the vehicle computing system can analyze a fused feature map to identify, using one or more machine-learned models, a list of objects identified from the feature map. A detection unit is one example of a means for determining, using the one or more machine-learned models, one or more objects in the area of the autonomous vehicle based on the fused representation.

The means can be configured to select a plurality of radar points from the radar sensor data and generate, using a machine-learned model, a similarity score for each selected radar point. For example, the vehicle computing system can determine, using similarity scores, points associated with the respective object. An association unit is one example of a means for selecting a plurality of radar points from the radar sensor data and generating, using a machine-learned model, a similarity score for each selected radar point.

The means can be configured to generate a weight associated with each radar point based on the similarity score and calculate a predicted velocity for the respective object based on a weighted average of the velocities associated with the plurality of radar points. For example, the vehicle computing system can adjust the direction of velocities of one or more radar points such that they are parallel to the direction of the respective object. The vehicle computing system can, based on the positioning of the point relative to the object, generate a weighted average of those velocities. An estimation unit is one example of a means for generating a weight associated with each radar point based on the similarity score and calculating a predicted velocity for the respective object based on a weighted average of the velocities associated with the plurality of radar points.

The means can be configured to generate a proposed motion plan based, at least in part, on the predicted velocity for the respective object. For example, the vehicle computing system can use the predicted velocity during the prediction and motion planning functions. By estimating the velocity of an object more accurately, the vehicle computing system can more accurately predict the future position of the object and generate more useful motion plans. A planning unit is one example of a means for generating a proposed motion plan based, at least in part, on the predicted velocity for the respective object.

The systems and methods described herein provide a number of technical effects and benefits. More particularly, the systems and methods of the present disclosure provide improved techniques for using both LIDAR and radar data to detect objects and estimate their velocity. Specifically, the velocity estimation system can integrate radar data with the LIDAR data while performing the perception function of the autonomous vehicle to detect objects, estimate their velocity, and thereby predict their path more efficiently without the drawbacks of other systems. By combining the radar and LIDAR data and fusing extracted features of each into a feature map before the object detection step occurs avoids time-consuming and costly calculations integrating results from the two sensor systems later on in the perception process and avoids losing low-level detection data that can allow the system to perform detection tasks more accurately. As a result, the vehicle computing system can more efficiently detect objects and predict their trajectories. This results in a reduction in the number of processing cycles necessary, reducing the amount of data storage needed, and reducing the amount of energy used by the system. Reducing energy consumption also increases the useful battery life of any battery systems included in the autonomous vehicle. Furthermore, improving the capabilities of the detection and prediction systems allows the autonomous vehicle to travel more safely.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

With reference to the figures, example embodiments of the present disclosure will be discussed in further detail.

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical takeoff and lift (VTOL) aircraft, etc.). The vehicle 105 can be a lightweight elective vehicle (e.g., bicycle, scooter, etc.). The vehicle 105 can be another type of vehicle (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105.

For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 140 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via different sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that are within the surrounding environment of the vehicle 105 based at least in part on the sensor data 155 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more waypoints (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 170C can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 170C can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190A (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 195 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 125. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2A:
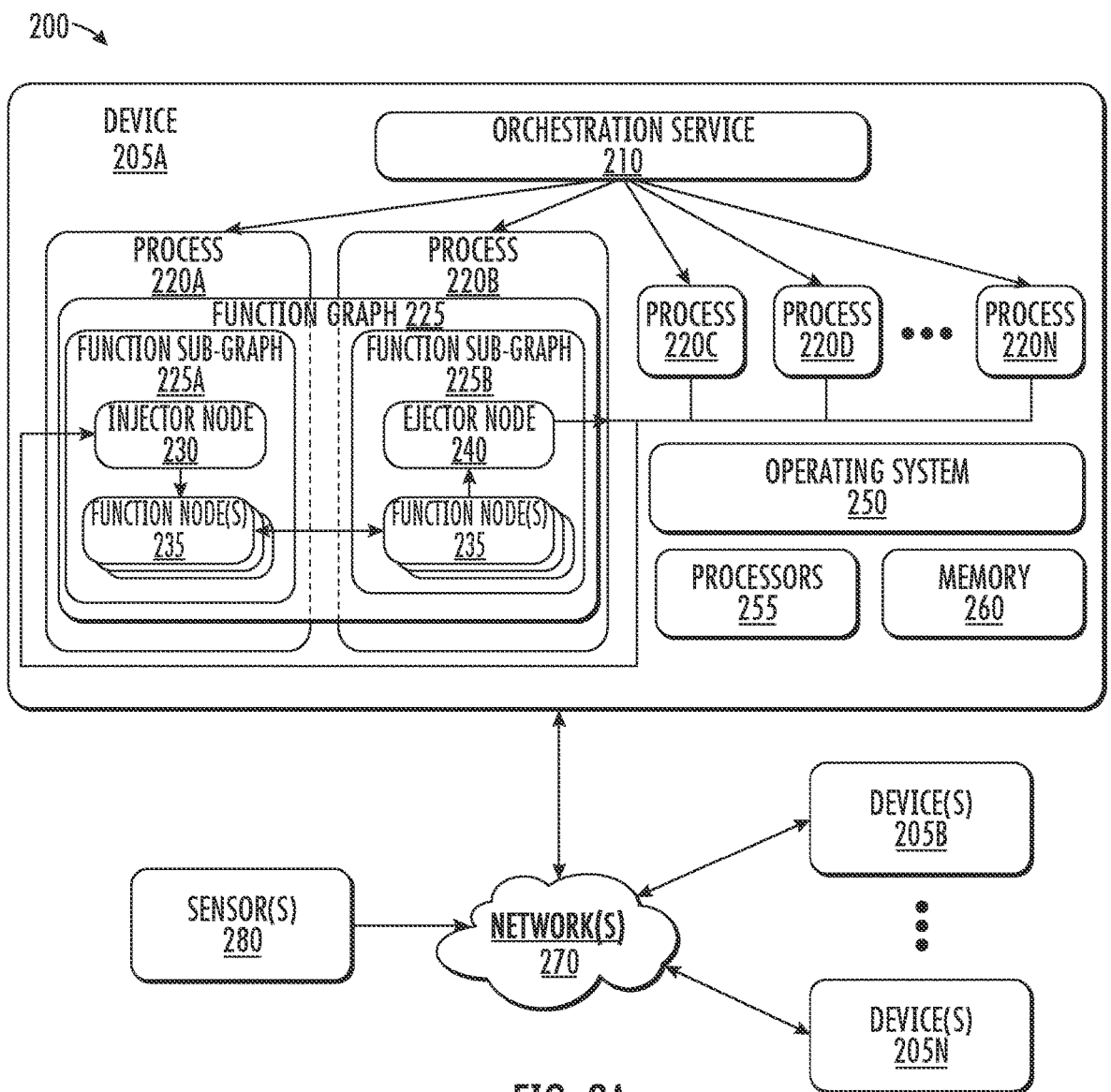
FIG. 2A depicts a diagram of an example system including a plurality of devices configured to execute one or more processes according to example implementations of the present disclosure.

FIG. 2A depicts a diagram of an example computing system 200 including one or more of the plurality of devices (e.g., plurality of devices 205A-N) of the computing system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a plurality of (e.g., series of) function nodes 235 arranged (e.g., by one or more directed edges) in a pipeline, graph architecture, etc.

Figure 2B:
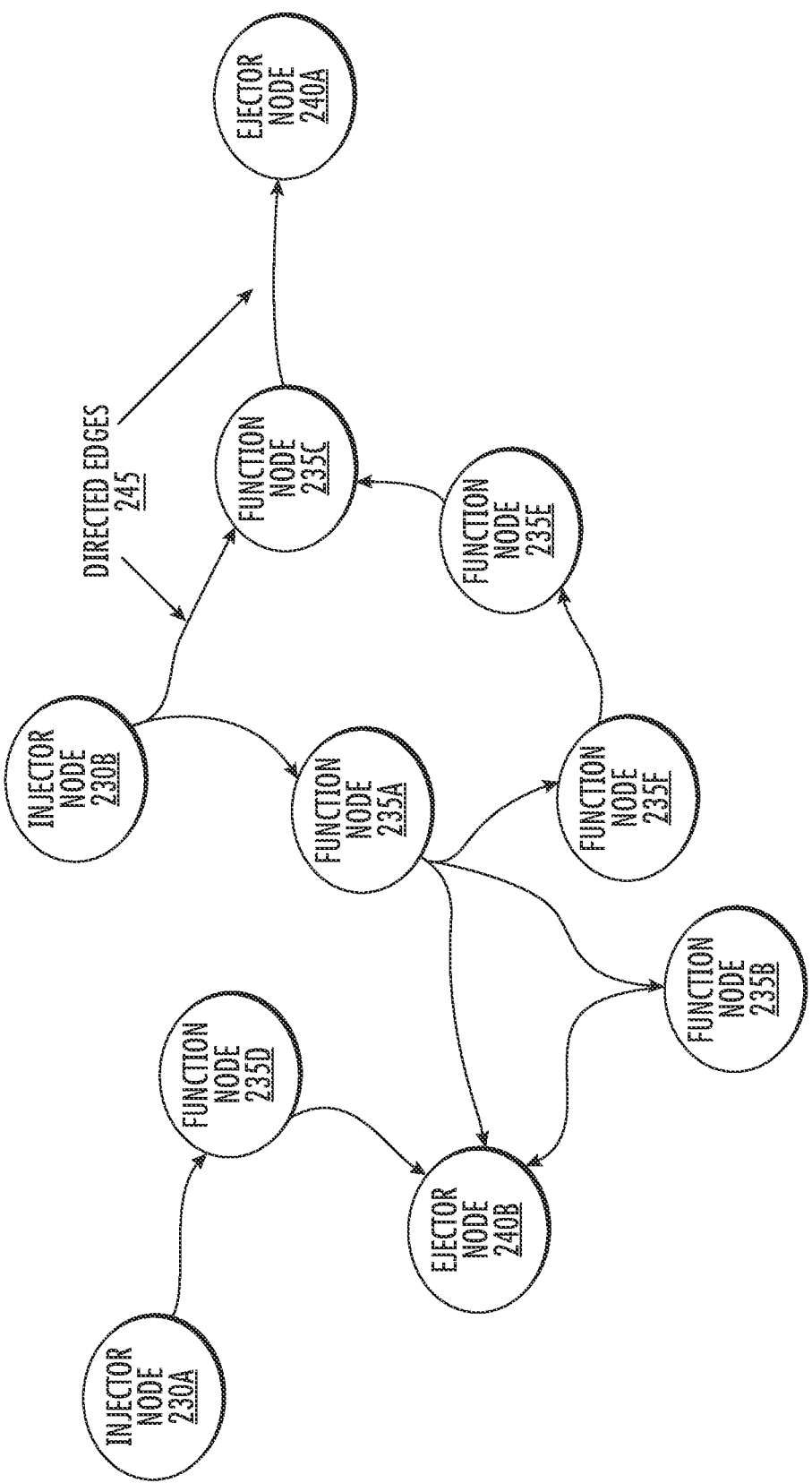
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235 can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

Each function node of the plurality of function nodes 235A-F can be arranged in a directed graph architecture (e.g., including a plurality of function graphs) and can be configured to obtain function input data associated with an autonomous vehicle based on the one or more directed edges 245 (e.g., of the directed graph 225). For instance, the function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. The function nodes 235A-F can generate function output data based on the function input data. For instance, the function nodes 235A-F can perform one or more functions of the autonomous vehicle on the function input data to obtain the function output data. The function nodes 235A-F can communicate the function output data to one or more other function nodes of the plurality of function nodes 235A-F based on the one or more directed edges 245 of the directed graph 225.

In addition, or alternatively, each function graph 225 can include one or more injector nodes 230A-B and one or more ejector nodes 240A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example, each of the one or more injector nodes 230A-B can include a function configured to obtain and/or process sensor data from a respective sensor 280 shown in FIG. 2A (e.g., sensor(s) 135 of FIG. 1). The ejector nodes 240A-B can be configured to communicate with one or more devices 205B-N and/or processes 220C-220N outside of the function graph 225 to provide function output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 220B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes. For instance, the messages communicated between nodes of a sub-graph dedicated to motion planning for an autonomous vehicle can help identify a path for the vehicle given the area/environment in which the vehicle is operating, motion constraints, costs, vehicle trajectories, etc.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N, etc. of the computing system 200 (e.g., the plurality of processes of the vehicle computing system 110, a plurality of processes of the one or more remote devices, etc.) can be communicatively connected over one or more wireless and/or wired networks 270. For instance, the plurality of devices 205A-N (and/or processes 220A-N of device 205A) can communicate over one or more communication channels. Each device and/or process can exchange messages over the one or more communicative channels using a message interchange format (e.g., JSON, IDL, etc.). By way of example, a respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system).

In this manner, devices can be configured to communicate messages between one or more devices, services, and/or other processes to carry out one or more tasks. The messages, for example, can include function output data associated with a respective function node (e.g., 235).

Figure 3:
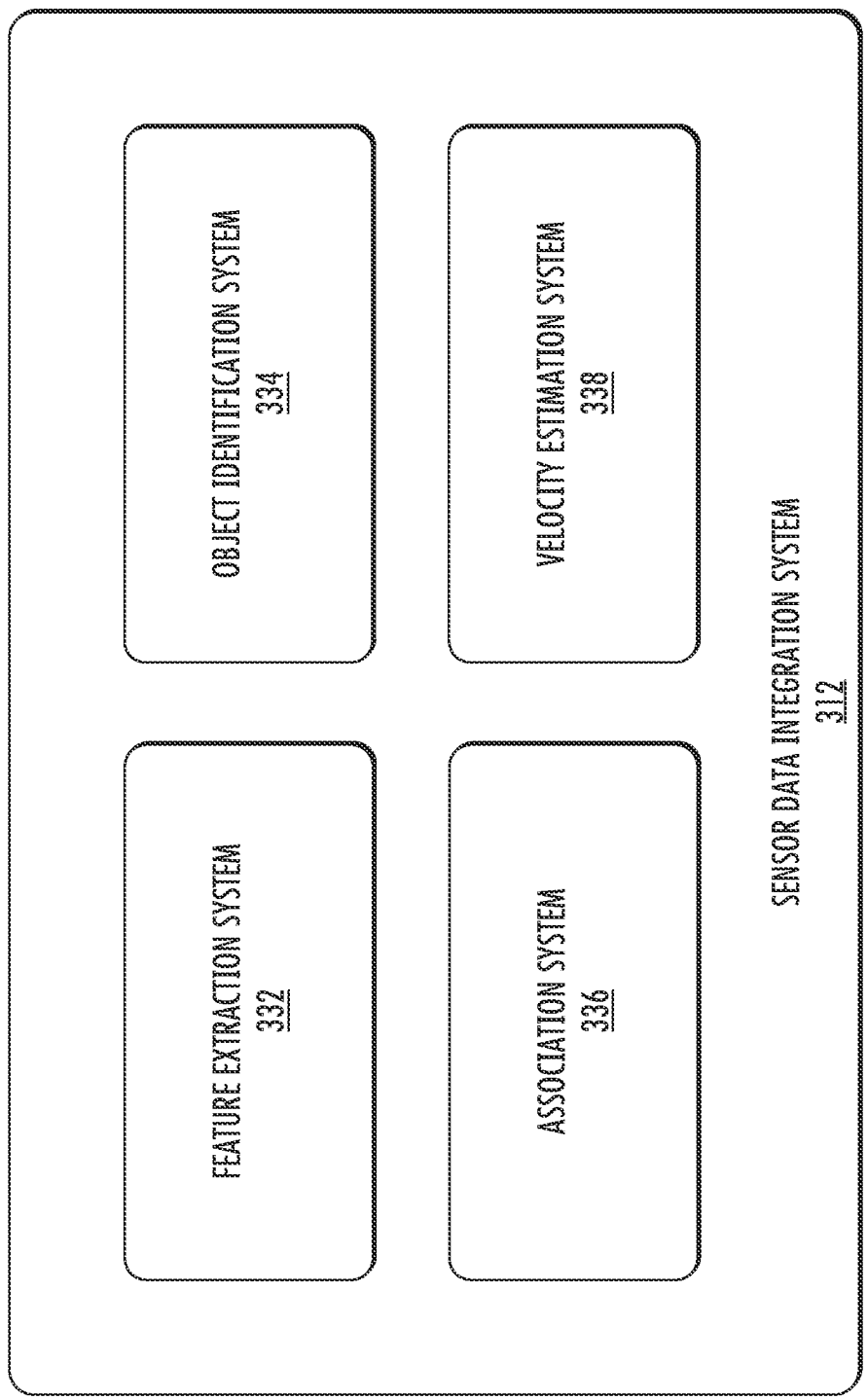
FIG. 3 depicts a block diagram of an example sensor data integration system according to example embodiments of the present disclosure.

FIG. 3 depicts a block diagram of an example sensor data integration system 312 according to example embodiments of the present disclosure. In some examples, the vehicle computing system (e.g., vehicle computing system 110 in FIG. 1) can include a sensor data integration system 312 that uses sensor data from both the LIDAR sensor and the radar sensor (and/or another type of sensor) to accurately perceive objects in the environment of the autonomous vehicle. The environment of the autonomous vehicle (e.g., autonomous vehicle 105 in FIG. 1) can include the area around the autonomous vehicle that is within the range of the sensors included in the autonomous vehicle (e.g., autonomous vehicle 105 in FIG. 1). The sensor data integration system 312 can include, for example, a feature extraction system 332, an object identification system 334, an association system 336, and a velocity estimation system 338.

The feature extraction system 332 can obtain sensor data from two or more sensors in the autonomous vehicle (e.g., autonomous vehicle 105 in FIG. 1). Specifically, the feature extraction system can access point cloud data from a LIDAR system. The point cloud data includes a plurality of points, each point associated with a position in three-dimensional space defined by a set of coordinates (e.g., x, y, and z coordinates). In some examples, each point can have luminance data associated with it (e.g., how strong, or bright was the reflected laser light when it was sensed by the LIDAR sensor) and a confidence value, the confidence value representing the degree to which the system is confident that the point represents an object.

The feature extraction system 332 can access radar point data. The radar point data can include a plurality of radar points. Each radar point can have a position defined by coordinate values and an associated velocity. The velocity can be determined (or estimated) by measuring the doppler shift associated with one or more reflected radar waves. Note that some radar systems do not include the ability to distinguish height so the position associated with a particular radar point can be limited to a two-dimensional x, y coordinate rather than a three-dimensional x, y, z coordinate. In some implementations, the feature extraction system 332 can access other types of sensor data.

The feature extraction system 332 can arrange the sensor data produced by the LIDAR sensor and the radar sensor into a voxel grid representation. Thus, for the point cloud data produced by the LIDAR, the three-dimensional space in which the point cloud data exists can be divided into a plurality of subsections. In general, each subsection can be the same or a substantially similar size. The point cloud data can include data produced by a plurality of sweeps of the LIDAR sensor (each sweep representing a complete rotation of the sensor) representing a period of time (e.g., all the sweeps that occur in a 0.5 second time period). The voxel grid representation can include a plurality of channels, each channel representing a separate sweep and thus being associated with a particular point in time. Thus, each channel can represent a full voxel grid representation for a particular period of time. Comparing several channels can allow the sensor data integration system as a whole to estimate the movement of objects within the area of the autonomous vehicle (e.g., autonomous vehicle 105 in FIG. 1).

Because the LIDAR sensor sweeps or radar cycles are generated by sensors attached to an autonomous vehicle, as the autonomous vehicle moves, the coordinate frame of the sensor data (both LIDAR and radar) included in each sensor sweep (or radar cycle) changes. For example, a stationary mailbox may appear in front of the autonomous vehicle (e.g., autonomous vehicle 105 in FIG. 1) in a sensor sweep or radar cycle associated with the current time but beside or behind the autonomous vehicle in a future sensor sweep (or radar cycle) as the autonomous vehicle (e.g., autonomous vehicle 105 in FIG. 1) moves past the mailbox. As such, the vehicle computing system (e.g., vehicle computing system 110 in FIG. 1) can transform the LIDAR point cloud data or radar point data into a common coordinate frame (e.g., the current coordinate frame).

In some examples, the voxel grid representation can cover a geographic area that has been subdivided into a plurality of equally-sized cubes. Voxels for the voxel grid representation of the LIDAR point cloud data can, for each voxel, include a scalar value representative of the number of points in the point cloud data in the voxel. As such, the scalar value can be a representation of density and be weighted based on the average distance of the points in the voxel from the sensor itself. This scalar value can be a distance-weighted density feature.

Similarly, the voxel grid representation of the radar point data can include, for each voxel, a scalar value that represents the number of radar points in the voxel (density) that is weighted based on the average distance of each radar point to the center of the voxels (e.g., the location of the sensor). It is worth noting that the voxel grid representation of the radar point data may differ from the voxel grid representation for the LIDAR data because, for at least some types of radar sensors, the vertical position of a given radar point may not be determined by the radar sensor and thus, the associated voxel grid representation may not include a height dimension. In addition, radar points that have no associated movement values may be filtered out. These radar points may be filtered out because they may be associated with background features or less relevant to the perception function.

The feature extraction system 332 can use the voxel grid representation of the LIDAR data as input to one or more machine-learned models. The one or more machine-learned models can identify feature data from the voxel grid representation of the LIDAR data. In some examples, feature data can include low level information about the LIDAR point cloud data and the radar points, including information about edges, corners, blobs, and so on. In other examples, the feature data can be non-interpretable (e.g., the models produce feature data that is used as input to other machine-learned models but is unintelligible to a human viewer). The voxel grid representation of the radar point data can be used as input to one or more machine-learned models and feature data can be generated for the voxel grid representation of the radar point data.

The resulting output can be a feature map representation for the LIDAR point cloud data and a feature map representation for the radar point data. A feature map representation can be a grid of values, associated with the LIDAR data or the radar data. Each value in the grid of values can be associated with a voxel in a voxel grid representation for the associated sensor data type and having associated feature data and representing a particular area.

The feature extraction system 332 can fuse the feature map representation resulting from the LIDAR point cloud data with the feature map representation resulting from the radar point data. In some examples, fusing the two map representations can include concatenating the feature data from both feature map representations and including the concatenated feature data in the fused representation.

The fused representation can be passed to the object identification system 334. The object identification system 334 can use a backbone network to extract multi-scale feature data from the fused representation. The backbone network can use one or more machine-learned models to generate a feature map for the fused representation. The feature map can represent the data in a bird's eye view (BEV) of the area.

The object identification system 334 can use the feature map as input to a machine-learned model that has been trained to output data identifying one or more objects in the area around the autonomous vehicle (e.g., autonomous vehicle 105 in FIG. 1). For example, the area around an autonomous vehicle (e.g., autonomous vehicle 105 in FIG. 1) can include a rectangular area extending 100 meters in front of and behind the autonomous vehicle and extending 25 meters to each side.

The machine-learned models can output a list of detected objects. Each object can be represented by data including the category associated with the object, the location of the object (in coordinates (e.g., x y coordinates relative to the location of the autonomous vehicle (e.g., autonomous vehicle 105 in FIG. 1)), the 2-D center position of the object within the area, in BEV, the width and length of the object, the object orientation (e.g., the direction the object is facing), a binary label indicates whether the object is moving or not, and the 2-D estimated velocity (e.g., values for the velocity representing an x-component of the velocity and a y-component of the velocity). In some examples, each object has an associated confidence score representing the likelihood that the object exists at its predicted location. The object identification system 334 can filter out objects with confidence scores that are below a threshold confidence value. This filtering step can be referred to as non maximum suppression (NMS).

The sensor data integration system 312 can pass the list of objects and the radar point data to the association system 336. The association system 336 can generate weighted velocity estimates for a plurality of radar points for each object. To do so, the association system 336 can identify a plurality of radar points for a particular object. In some examples, the association system 336 can select radar points within a particular distance of the object. In other examples, the association system 336 can select all radar points in the radar point data. For a respective object, the association system 336 can canonicalize the velocities for the selected radar points. Canonicalizing the velocities for a particular radio point can include identifying the object direction for the respective object. The object direction can be generated during the object detection described above. The association system 336 can calculate a velocity for the point that is parallel to the direction of the respective object.

To do so, the association system 336 can generate a parallel velocity $v^{bp}$:

$$v^{bp} = \min\left(50, \frac{V_\|}{\cos(\gamma)}\right)$$

wherein $v_\|$ is the original velocity of the radar point and $$\gamma = \arccos\frac{|v \cdot p|}{\|v\| \cdot \|p\|}$$

is the angle between object velocity vector v and radial direction p. This also caps the velocity at 50 m/s to avoid extremely large values that are not realistic.

The association system 336 can generate a similarity score between the respective object and each radar point in the plurality of selected radar points by using pairwise feature data as input to a matching function. The pairwise feature data for a particular object (D) and a particular radar point Q can be $$f(D,Q) = (f^D, f^{DQ})$$

where $$f^D = \left(w, h, \|v\|, \frac{v_x}{\|v\|}, \frac{v_y}{\|v\|}, \cos(\gamma)\right)$$

$$f^{DQ} = (dx, dy, dt, v^{bp})$$

wherein w and h are the width and height of the object, v is the object velocity vector, $v_x$ and $v_y$ are x and y components of the velocity, and $d_x$, $d_y$, $d_t$ are the offsets between center locations and timestamps of radar point and the object.

The matching function can be parameterized using a multi-layer perceptron (MLP) network such that the similarity score (si,j) is defined by $$s_{i,j} = MLP_{match}(f(D_i, Q_j))$$

The similarity scores can be used by the velocity estimation system 338 to generate an estimated velocity for the respective object. To do so, the velocity estimation system 338 can normalize the similarity scores. Normalizing the similarity scores can include scaling the similarity scores such that the sum of all the scores is equal to one, while the value of the scores relative to each other would remain the same. Thus, if a first similarity score were double the value of a second similarity score before the values were normalized, that ratio would remain after normalization.

In some examples, if the similarity score for a particular radar point is below a threshold value, the normalization process may result in that value being assigned a weighted value of zero. In this way, radar points that are too far away from the object or have velocities that are directed away from the direction of travel of the object do not affect the estimated velocity for that object.

Once the similarity scores have been normalized, the normalized similarity scores can be used as weighting factors for combining the velocities of the radar points associated with the similarity scores. The velocity estimation system 338 can generate an estimated velocity of the object by weighting the velocities associated with each radar point and averaging the weighted velocities. For example, if three radar points have similarity scores such that the similarity score of point 1 is 60, the similarity score of point 2 is 30, and the similarity score of point 3 is 10, the normalized values for these points would be 0.6, 0.3, and 0.1 respectively.

Continuing with this example, if the velocity associated with point 1 is 10 m/s, the velocity associated with point 2 is 30 m/s, and the velocity associated with point 3 is 12, the weighted scores would be weighted velocities would be 6 m/s, 9 m/s, and 1.2 m/s respectively, resulting in an estimated velocity for the object of 16.2 m/s.

The estimated velocity can be assigned to the respective object and the value can be stored for use in the prediction and motion planning functions of the autonomous vehicle (e.g., autonomous vehicle 105 in FIG. 1). For example, the vehicle computing system (e.g., vehicle computing system 110 in FIG. 1) can use the estimated velocities, along with other information, to generate motion plans which are then executed by the autonomous vehicle.

Figure 4:
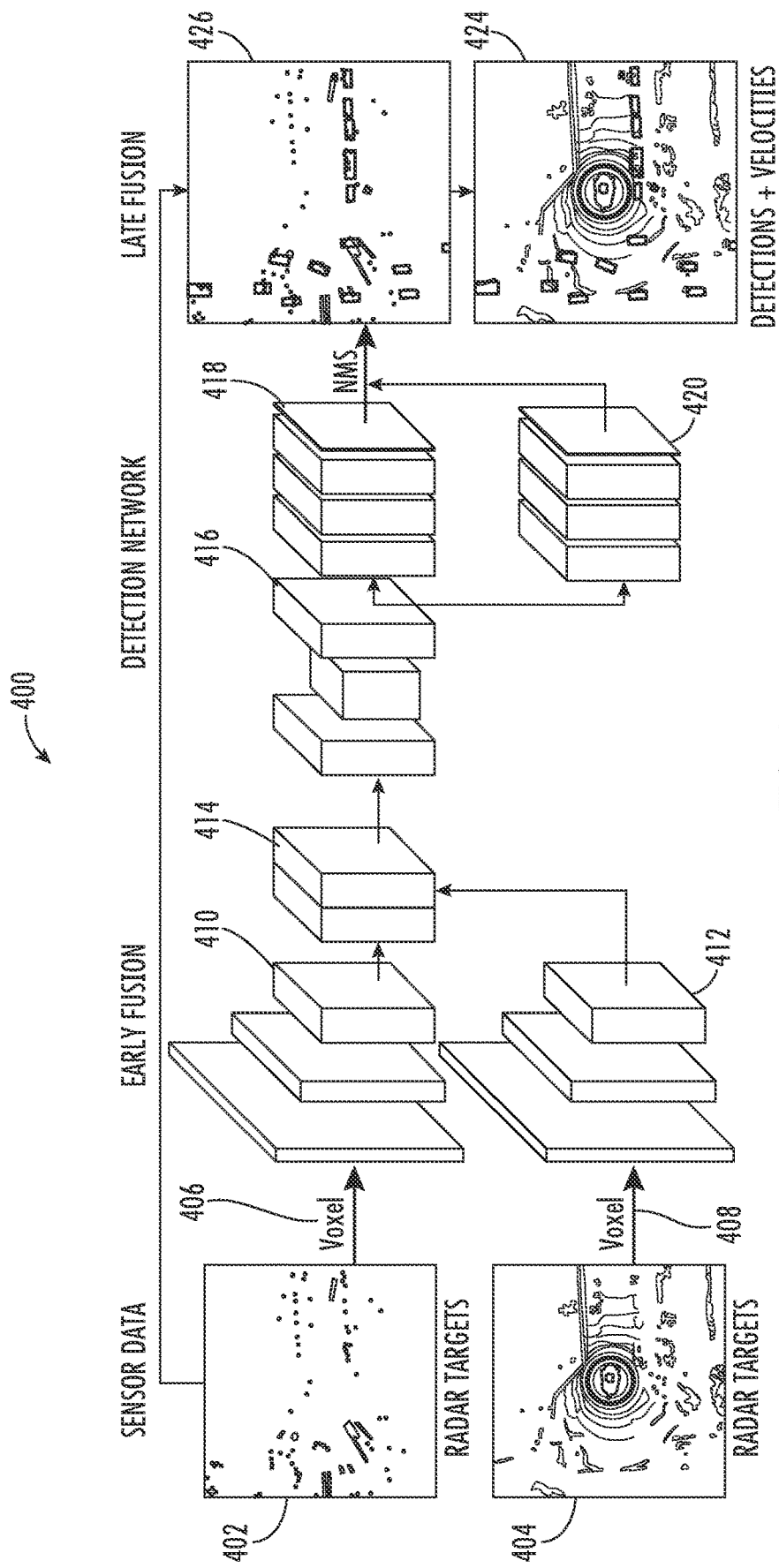
FIG. 4 depicts an example diagram illustrating a process for estimating the location and velocity of objects based on LIDAR and radar data according to example embodiments of the present disclosure.

FIG. 4 depicts an example diagram illustrating a process 400 for estimating the location and velocity of objects based on LIDAR and radar data according to example embodiments of the present disclosure. To do so, the vehicle computing system (e.g., vehicle computing system 110 in FIG. 1) can access radar data 402 and LIDAR data 404. The vehicle computing system (e.g., vehicle computing system 110 in FIG. 1) can generate a voxel grid representation 406 of the radar data 402 and a voxel grid representation 408 of the LIDAR data 404.

The voxel grid representation 406 of the radar data 402 can be used as input to a machine learned model. The machine learned model can generate a feature map 410 associated with the radar data. Similarly, the voxel grid representation 408 of the LIDAR data 404 can be used as input to a machine-learned model. The machine-learned model can generate a feature map 412 associated with the LIDAR data.

The vehicle computing system (e.g., vehicle computing system 110 in FIG. 1) can generate a fused representation 414 of the first feature map 410 associated with the radar data 402 and the second feature map 412 associated with the LIDAR data 404. The fused representation 414 can be organized into a bird's eye view grid, with each point on the grid having associated feature data from both the first feature map 410 and the second feature map 412.

The fused representation 414 can be used as input to one or more machine-learned models to extract multi-scale feature data from the fused representation. A backbone network 416 can use one or more machine-learned models to generate a feature map for the fused representation. The feature map 418 can represent the data in a bird's eye view (BEV) of the area.

The feature map can be used as input to a machine-learned model 420 that has been trained to output an object map 424 identifying one or more objects in the area around the autonomous vehicle (e.g., autonomous vehicle 105 in FIG. 1).

The machine-learned models can output a list 424 of detected objects. The vehicle computing system (e.g., vehicle computing system 110 in FIG. 1) can filter out objects with confidence scores that are below a threshold confidence value. This filtering step can be referred to as non maximum suppression (NMS).

The vehicle computing system (e.g., vehicle computing system 110 in FIG. 1) can use the list of objects and the radar point data to generate a velocity map 426 for each object in the list of objects 424. The velocity map 426 can include an estimated velocity for each object in the list of objects 424.

Figure 5:
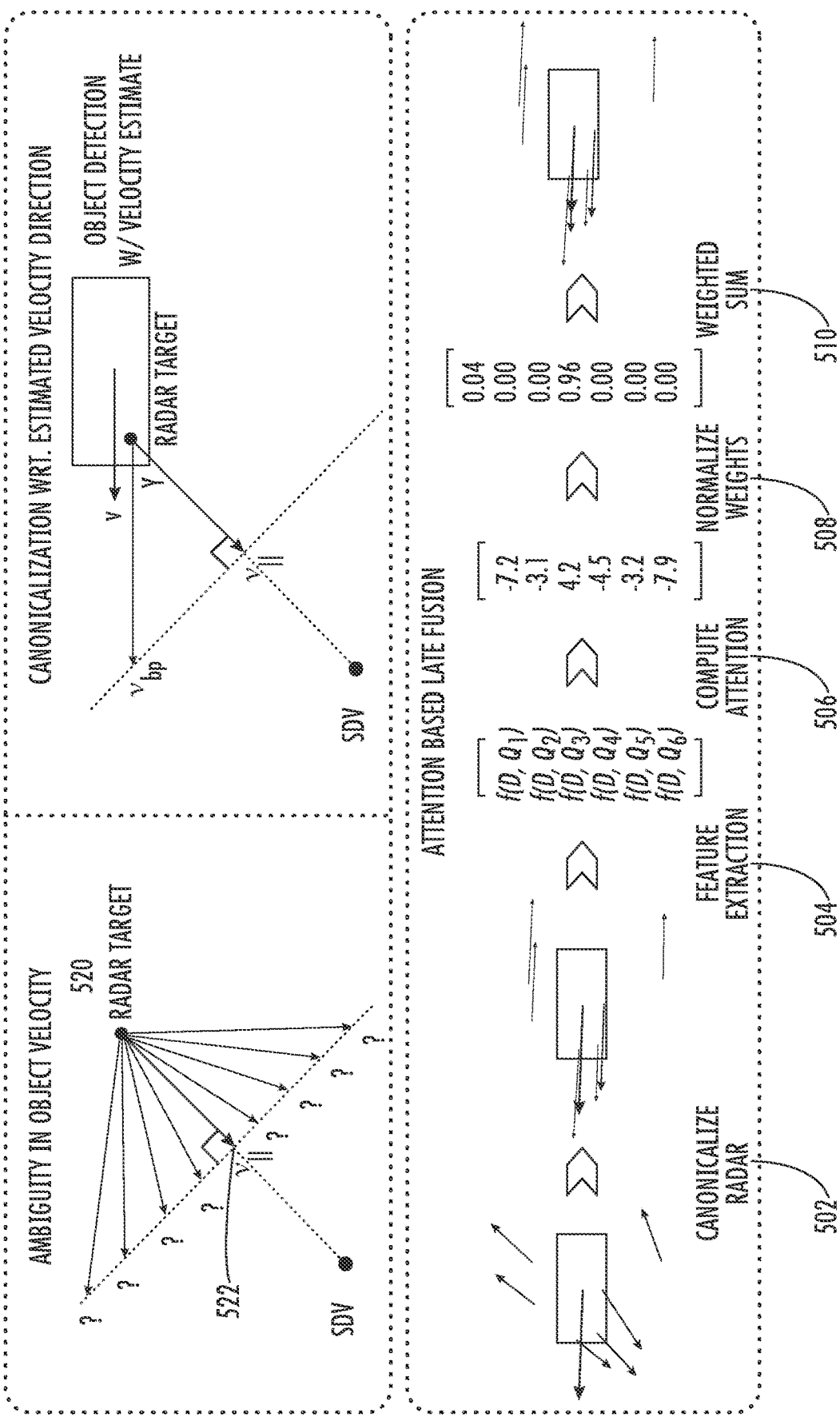
FIG. 5 depicts an example diagram illustrating attention based late fusion process according to example embodiments of the present disclosure.

FIG. 5 depicts an example diagram illustrating an attention based late fusion process according to example embodiments of the present disclosure. The vehicle computing system (e.g., vehicle computing system 110 in FIG. 1) can perform a late fusion process to generate information describing the location and estimated velocity of a plurality of objects.

For a respective object, in a list of objects produced by one or more machine-learned models, the vehicle computing system (e.g., vehicle computing system 110 in FIG. 1) can canonicalize 502 the velocities for one or more radar points selected to be associated with the particular object. Canonicalizing the velocities for a particular radio point 520 can include identifying the object direction for the respective object. The object direction can be generated during the object detection described above. The initially measured velocity 522 of the radar point 520 can be associated with a plurality of estimated velocities. The vehicle computing system (e.g., vehicle computing system 110 in FIG. 1) can use the object direction to identify (or calculate) the estimated velocity for the radar point. In some examples, the identified (or calculated) velocity can be parallel to the direction of the respective object.

The vehicle computing system (e.g., vehicle computing system 110 in FIG. 1) can extract feature data 504 from the canonicalized radar points. The feature data can be used as input to a matching function that generates similarity scores (or attention scores) 506 based on the following using a multi-layer perceptron (MLP) network such that the similarity score ($s_{i,j}$) is defined by $$s_{i,j} = \text{MLP}_{match}(f(D_i, Q_j))$$

The pairwise feature data for a particular object (D) and a particular radar point Q can be used to compute an attention value. The attention value can also be referred to as a similarity score. In some examples, the attention values can be generated by one or more machine-learned models.

The similarity scores can be used by the vehicle computing system (e.g., vehicle computing system 110 in FIG. 1) to generate an estimated velocity for the respective object. To do so, the vehicle computing system (e.g., vehicle computing system 110 in FIG. 1) can normalize 508 the similarity scores. Normalizing 508 the similarity scores can include scaling the similarity scores such that the sum of all the scores is equal to one, while the value of the scores relative to each other would remain the same.

Once the similarity scores have been normalized, the normalized similarity scores can be used as weighting factors for combining the velocities of the radar points associated with the similarity scores. The vehicle computing system (e.g., vehicle computing system 110 in FIG. 1) can generate an estimated velocity of the object by weighting the velocities associated with each radar point and summing 510 the weighted velocities. For example, if three radar points have similarity scores such that the similarity score of point 1 is 60, the similarity score of point 2 is 30, and the similarity score of point 3 is 10, the normalized values for these points would be 0.6, 0.3, and 0.1 respectively. As described herein, if the velocity associated with point 1 is 10 m/s, the velocity associated with point 2 is 30 m/s, and the velocity associated with point 3 is 12, the weighted scores would be weighted velocities would be 6 m/s, 9 m/s, and 1.2 m/s respectively, resulting in a summed estimated velocity for the object of 16.2 m/s.

Figure 6:
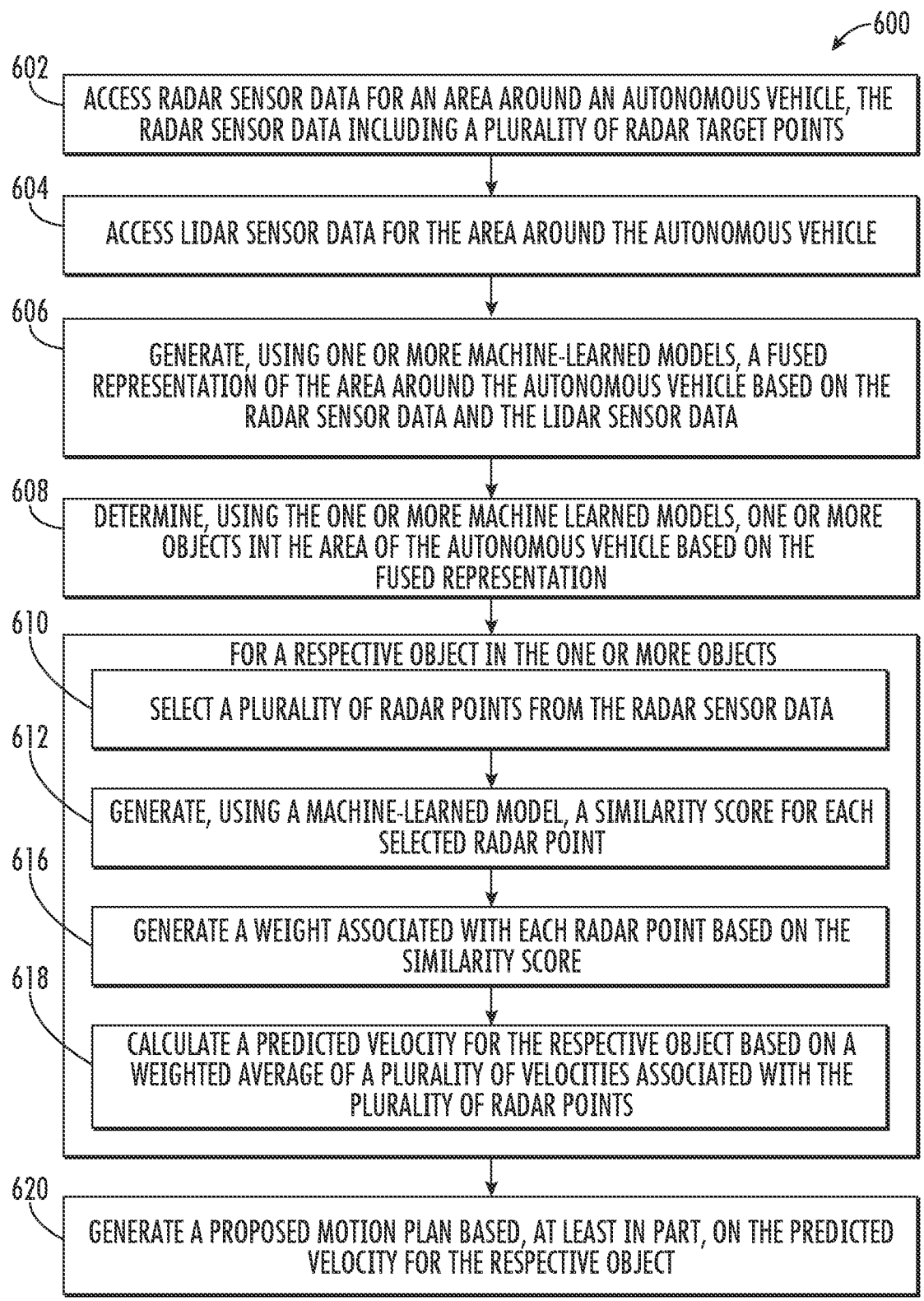
FIG. 6 depicts a flow chart diagram of an example method according to example embodiments of the present disclosure.

FIG. 6 depicts a flow diagram of an example method 600 for integrating radar data for improved object detection in autonomous vehicles (e.g., autonomous vehicle 105 in FIG. 1) according to example embodiments of the present disclosure. One or more portion(s) of the method 600 can be implemented by one or more computing devices such as, for example, the computing devices described in FIGS. 1, 2A, 2B, and 8. Moreover, one or more portion(s) of the method 600 can be implemented as an algorithm on the hardware components of the device(s) described herein (e.g., as in FIGS. 1, 2A, 2B, and 8) to, for example, integrate radar data for improved object detection in autonomous vehicles (e.g., autonomous vehicle 105 in FIG. 1). FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The following example is described the technology of this disclosure within the context of an autonomous vehicle/vehicle computing system for example purposes only. As described herein, the technology described is not limited to autonomous vehicles and can be implemented within other robotic and computing systems.

An autonomous vehicle (e.g., autonomous vehicle 105 in FIG. 1) can include a vehicle computing system (e.g., vehicle computing system 110 in FIG. 1). The vehicle computing system (e.g., vehicle computing system 110 in FIG. 1) can access, at 602, radar sensor data for an area around an autonomous vehicle, the radar sensor data including a plurality of radar points. In some examples, the radar sensor data includes, for each radar point, a coordinate designating a location of the radar point and a velocity associated with the radar point. The coordinate for a particular radar point can be defined based on a coordinate frame of the radar sensor at its current position.

In some examples, the radar sensor data includes data from a plurality of cycles of the radar sensor. Each cycle can represent a period of time in which the radar sensor collects data. In some examples, the number of cycles included in radar sensor data can be based on the amount of time in which those cycles of data are captured. Thus, the vehicle computing system (e.g., vehicle computing system 110 in FIG. 1) can gather all radar sensor data captured by cycles that occurred in the past 0.5 seconds.

In some examples, the vehicle computing system (e.g., vehicle computing system 110 in FIG. 1) can filter the radar sensor data to remove radar points that have an associated velocity value below a predetermined threshold. For example, radar points that are static (e.g., have no velocity) may be associated with very distant objects that are not of interest to the vehicle computing system and are thus filtered from the data set.

The vehicle computing system (e.g., vehicle computing system 110 in FIG. 1) can, at 604, access LIDAR sensor data for the area around the autonomous vehicle. In some examples, the LIDAR sensor data includes a plurality of LIDAR points, each LIDAR point having an associated location. The location can be defined by a three-dimensional coordinate. For example, the point can have an associated x value, y value, and z value. In some examples, the LIDAR sensor data includes data from a plurality of sweeps of the LIDAR sensor. As with the radar cycles, the system can include all the sensor sweeps that occurred within a given period of time (e.g., the most recent 0.5 second time period).

The vehicle computing system (e.g., vehicle computing system 110 in FIG. 1) can, at 606, generate, using one or more machine-learned models, a fused representation of the area around the autonomous vehicle (e.g., autonomous vehicle 105 in FIG. 1) based on the radar sensor data and the LIDAR sensor data. To do so, the vehicle computing system (e.g., vehicle computing system 110 in FIG. 1) can generate a voxel grid representation of the radar sensor data and a voxel grid representation of the LIDAR sensor data.

In some examples, the voxel grid representation of the radar sensor data can include a plurality of voxels. In some examples, each voxel can be associated with a voxel occupancy value. The voxel occupancy value for a respective voxel can be based on a number of radar points that fall within the area associated with the respective voxels. The vehicle computing system (e.g., vehicle computing system 110 in FIG. 1) can identify, using the voxel grid representation of the radar sensor data as input to one or more machine-learned models, feature data for the radar sensor data. The vehicle computing system (e.g., vehicle computing system 110 in FIG. 1) can identify, using the voxel grid representation of the LIDAR sensor data as input to one or more machine-learned models, feature data for the LIDAR sensor data.

In some examples, the vehicle computing system (e.g., vehicle computing system 110 in FIG. 1) can concatenate feature data associated with the radar sensor data and the feature data associated with the LIDAR sensor data and associating the concatenated data with a corresponding point in the fused representation.

The vehicle computing system (e.g., vehicle computing system 110 in FIG. 1) can, at 608, determine, using the one or more machine-learned models, one or more objects in the area of the autonomous vehicle (e.g., autonomous vehicle 105 in FIG. 1) based on the fused representation. The vehicle computing system (e.g., vehicle computing system 110 in FIG. 1) can determine, for each identified object, a location for the center of the object and a direction of movement. This can be determined by comparing the position of the object in a first time sweep to the position of the object in a second time sweep.

The vehicle computing system (e.g., vehicle computing system 110 in FIG. 1) can, for a respective object in the one or more objects, select, at 610, a plurality of radar points from the radar sensor data. In some examples, the vehicle computing system (e.g., vehicle computing system 110 in FIG. 1) can determine, for each radar point in the plurality of radar points, a distance from the radar point to a point associated with the respective object. The vehicle computing system (e.g., vehicle computing system 110 in FIG. 1) can select one or more radar points based on a determined distance between each radar point and a point associated with the respective object. For example, the vehicle computing system (e.g., vehicle computing system 110 in FIG. 1) can associate radar points with the object closest to them. In some examples, the point associated with the respective object is an estimated center of the object.

The vehicle computing system (e.g., vehicle computing system 110 in FIG. 1) can, at 612, generate, using a machine-learned model, a similarity score for each selected radar point. In some examples, the respective object has an estimated direction. The similarity score can be based, at least in part, on the similarity of the velocity associated with a particular radar point and the estimated direction of the object.

The vehicle computing system (e.g., vehicle computing system 110 in FIG. 1) can generate, at 616, a weight associated with each radar point based on the similarity score. To do so, the vehicle computing system (e.g., vehicle computing system 110 in FIG. 1) can normalize the weights associated with the plurality of radar points. The vehicle computing system (e.g., vehicle computing system 110 in FIG. 1) can generate a weight associated with each radar point based on the similarity score. In some examples, the vehicle computing system (e.g., vehicle computing system 110 in FIG. 1) can generate, for a particular radar point, a modified velocity value based on the estimated direction of the respective object and the velocity associated with the radar point. In some examples, the modified velocity value is parallel to the estimated direction of the respective object.

The vehicle computing system (e.g., vehicle computing system 110 in FIG. 1) can calculate, at 618, a predicted velocity for the respective object based on a weighted average of a plurality of velocities associated with the plurality of radar points. The vehicle computing system (e.g., vehicle computing system 110 in FIG. 1) can generate a proposed motion plan based on the predicted velocity for the respective object. The vehicle computing system (e.g., vehicle computing system 110 in FIG. 1) can transmit vehicle motion controls to one or more vehicle control systems to implement the motion plan.

Figure 7:
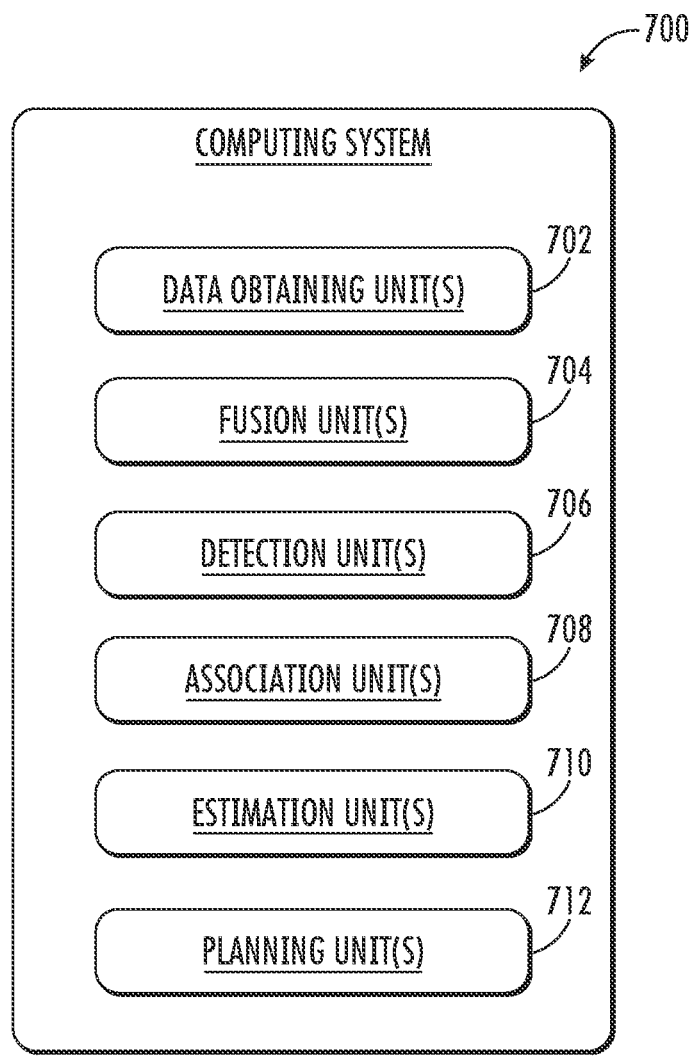
FIG. 7 depicts an example system with units for performing operations and functions according to example aspects of the present disclosure.

FIG. 7 depicts an example system 700 with units for performing operations and functions according to example aspects of the present disclosure. Various means can be configured to perform the methods and processes described herein. For example, a computing system can include data obtaining units(s) 702, fusion units(s) 704, detection units(s)706, association unit(s) 708, estimation unit(s) 710, planning unit(s) 712, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to access radar sensor data for an area around an autonomous vehicle (e.g., autonomous vehicle 105 in FIG. 1) the radar sensor data and LIDAR sensor data for the area around the autonomous vehicle. For example, an autonomous vehicle (e.g., autonomous vehicle 105 in FIG. 1) can receive sensor data from a LIDAR sensor and a radar sensor. A data obtaining unit 702 is one example of a means for accessing radar sensor data and LIDAR sensor data for the area around the autonomous vehicle (e.g., autonomous vehicle 105 in FIG. 1).

The means can be configured to generate, using one or more machine-learned models, a fused representation of the area around the autonomous vehicle (e.g., autonomous vehicle 105 in FIG. 1) based on the radar sensor data and the LIDAR data. For example, a machine-learned model can be trained to accept LIDAR and radar data as input and to output a fused feature map of the area around the autonomous vehicle (e.g., autonomous vehicle 105 in FIG. 1). A fusion system 704 is one example of a means for generating, using one or more machine-learned models, a fused representation of the area around the autonomous vehicle (e.g., autonomous vehicle 105 in FIG. 1) based on the radar sensor data and the LIDAR data.

The means can be configured to determine, using the one or more machine-learned models, one or more objects in the area of the autonomous vehicle (e.g., autonomous vehicle 105 in FIG. 1) based on the fused representation. For example, the vehicle computing system (e.g., vehicle computing system 110 in FIG. 1) can analyze a fused feature map to identify, using one or more machine-learned models, a list of objects identified from the feature map. A detection unit 706 is one example of a means for determining, using the one or more machine-learned models, one or more objects in the area of the autonomous vehicle (e.g., autonomous vehicle 105 in FIG. 1) based on the fused representation.

The means can be configured to select a plurality of radar points from the radar sensor data and generate, using a machine-learned model, a similarity score for each selected radar point. For example, the vehicle computing system (e.g., vehicle computing system 110 in FIG. 1) can determine, using similarity scores, points associated with the respective object. An association unit 708 is one example of a means for selecting a plurality of radar points from the radar sensor data and generating, using a machine-learned model, a similarity score for each selected radar point.

The means can be configured to generate a weight associated with each radar point based on the similarity score and calculate a predicted velocity for the respective object based on a weighted average of the velocities associated with the plurality of radar points. For example, the vehicle computing system (e.g., vehicle computing system 110 in FIG. 1) can adjust the direction of velocities of one or more radar points such that they are parallel to the direction of the respective object. The vehicle computing system (e.g., vehicle computing system 110 in FIG. 1) can, based on the positioning of the point relative to the object, generate a weighted average of those velocities. An estimation unit 710 is one example of a means for generating a weight associated with each radar point based on the similarity score and calculating a predicted velocity for the respective object based on a weighted average of the velocities associated with the plurality of radar points.

The means can be configured to generate a proposed motion plan based, at least in part, on the predicted velocity for the respective object. For example, the vehicle computing system (e.g., vehicle computing system 110 in FIG. 1) can use the predicted velocity during the prediction and motion planning functions. By estimating the velocity of an object more accurately, the vehicle computing system (e.g., vehicle computing system 110 in FIG. 1) can more accurately predict the future position of the object and generate more useful motion plans. A planning unit 712 is one example of a means for generating a proposed motion plan based, at least in part, on the predicted velocity for the respective object.

Figure 8:
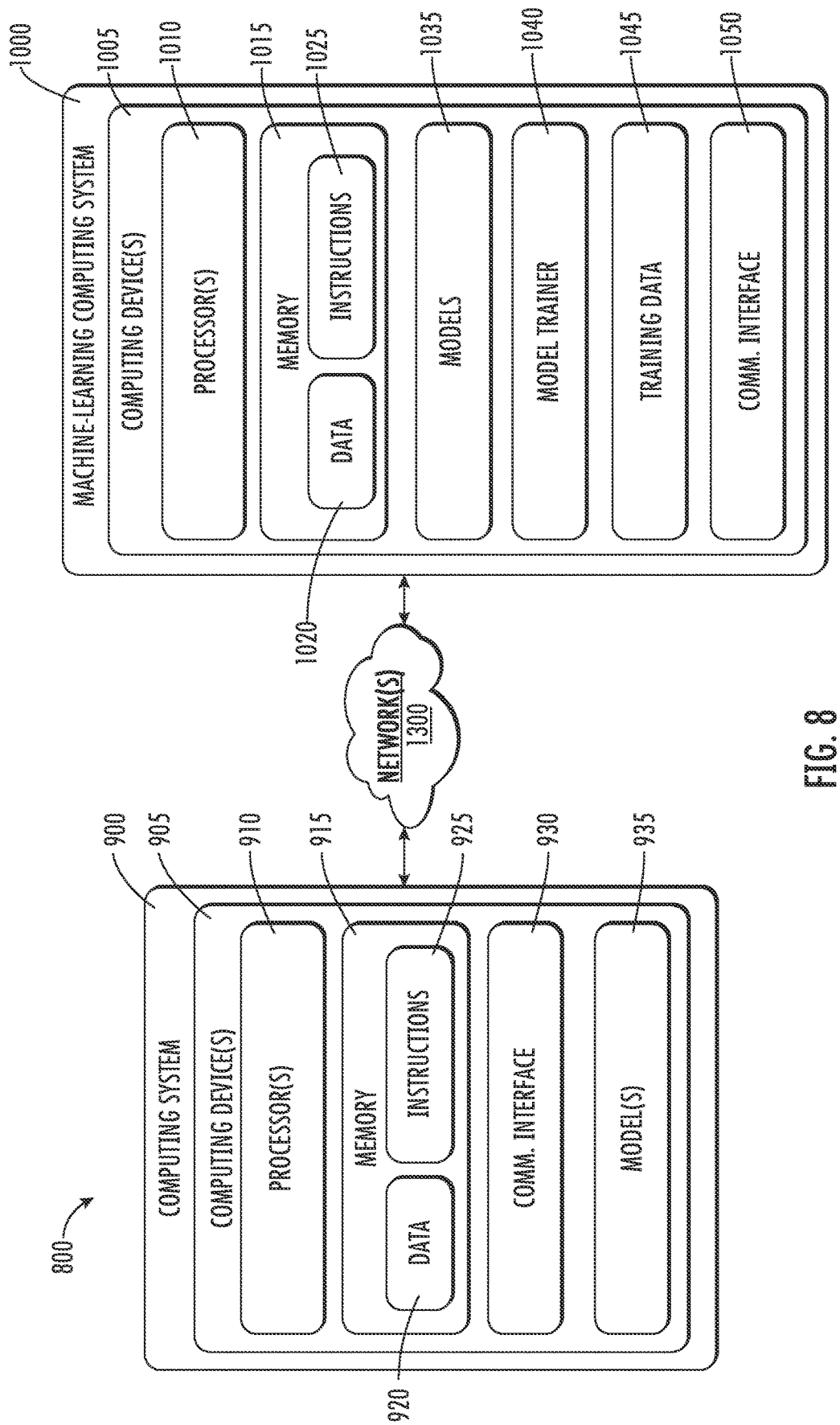
FIG. 8 depicts example system components according to example aspects of the present disclosure.

FIG. 8 depicts a block diagram of an example computing system 800 according to example embodiments of the present disclosure. The example system 800 includes a computing system 900 and a machine learning computing system 1000 that are communicatively coupled over one or more networks 1300.

In some implementations, the computing system 900 can perform a process for integrating radar data for improved object detection in autonomous vehicles. In some implementations, the computing system 900 can be included in an autonomous vehicle. For example, the computing system 900 can be on-board the autonomous vehicle (e.g., autonomous vehicle 105 in FIG. 1). In other implementations, the computing system 900 is not located on-board the autonomous vehicle (e.g., autonomous vehicle 105 in FIG. 1). The computing system 900 can include one or more distinct physical computing devices.

The computing system 900 can include a computing device 905. The computing device 905 can include one or more processors 910 and a memory 915. The one or more processors 910 can be any suitable processing device (e.g., a processor core, a microprocessor, an ASIC, a FPGA, a controller, a microcontroller, etc.) and can be one processor or a plurality of processors that are operatively connected. The memory 915 can include one or more non-transitory computer-readable storage media, such as RAM, ROM, EEPROM, EPROM, one or more memory devices, flash memory devices, etc., and combinations thereof.

The memory 915 can store information that can be accessed by the one or more processors 910. For instance, the memory 915 (e.g., one or more non-transitory computer-readable storage mediums, memory devices) can store data that can be obtained, received, accessed, written, manipulated, created, and/or stored. The data 920 can include any of the data/information described herein and/or other data. In some implementations, the computing system 900 can obtain data from one or more memory device(s) that are remote from the computing system 900.

The memory 915 can also store computer-readable instructions 925 that can be executed by the one or more processors 910. The instructions 925 can be software written in any suitable programming language or can be implemented in hardware. Additionally, or alternatively, the instructions 925 can be executed in logically and/or virtually separate threads on processor(s) 910.

For example, the memory 915 can store instructions 925 that when executed by the one or more processors 910 cause the one or more processors 910 (the computing system) to perform any of the operations and/or functions described herein, including, for example, insert functions.

According to an aspect of the present disclosure, the computing device 905 can store or include one or more machine-learned models 935. As examples, the machine-learned models 935 can be or can otherwise include various machine-learned models such as, for example, neural networks (e.g., deep neural networks), support vector machines, decision trees, ensemble models, k-nearest neighbors models, Bayesian networks, multi-layer perceptron networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 900 can receive the one or more machine-learned models 935 from the machine learning computing system 1000 over network(s) 1300 and can store the one or more machine-learned models 935 in the memory 915. The computing system 900 can then use or otherwise implement the one or more machine-learned models 935 (e.g., by processor(s) 910). In particular, the computing system 900 can implement the machine learned model(s) 935 to integrate radar data with LIDAR data for improved object detection in autonomous vehicles.

The machine learning computing system 1000 can include one or more computing devices 1005. The machine learning computing system 1000 can include one or more processors 1010 and a memory 1015. The one or more processors 1010 can be any suitable processing device (e.g., a processor core, a microprocessor, an ASIC, a FPGA, a controller, a microcontroller, etc.) and can be one processor or a plurality of processors that are operatively connected. The memory 1015 can include one or more non-transitory computer-readable storage media, such as RAM, ROM, EEPROM, EPROM, one or more memory devices, flash memory devices, etc., and combinations thereof.

The memory 1015 can store information that can be accessed by the one or more processors 1010. For instance, the memory 1015 (e.g., one or more non-transitory computer-readable storage mediums, memory devices) can store data 1020 that can be obtained, received, accessed, written, manipulated, created, and/or stored. The data 1020 can include, for instance, include any of the data/information described herein and/or other data. In some implementations, the machine learning computing system 1000 can obtain data from one or more memory device(s) that are remote from the machine learning computing system 1000.

The memory 1015 can also store computer-readable instructions 1025 that can be executed by the one or more processors 1010. The instructions 1025 can be software written in any suitable programming language or can be implemented in hardware. Additionally, or alternatively, the instructions 1025 can be executed in logically and/or virtually separate threads on processor(s) 1010.

For example, the memory 1015 can store instructions 1025 that when executed by the one or more processors 1010 cause the one or more processors 1010 (the computing system) to perform any of the operations and/or functions described herein, including, for example, insert functions.

In some implementations, the machine learning computing system 1000 includes one or more server computing devices. If the machine learning computing system 1000 includes multiple server computing devices, such server computing devices can operate according to various computing architectures, including, for example, sequential computing architectures, parallel computing architectures, or some combination thereof.

In addition or alternatively to the model(s) 1035 at the computing system 900, the machine learning computing system 1000 can include one or more machine-learned models 1035. As examples, the machine-learned models 1035 can be or can otherwise include various machine-learned models such as, for example, neural networks (e.g., deep neural networks), support vector machines, decision trees, ensemble models, k-nearest neighbors models, Bayesian networks, multi-layer perceptrons, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1000 can communicate with the computing system 900 according to a client-server relationship. For example, the machine learning computing system 1000 can implement the machine-learned models 1035 to provide a web service to the computing system 900. For example, the web service can provide a process to integrate information from radar data with LIDAR data to enable improved object detection in autonomous vehicles.

Thus, machine-learned models 935 can be located and used at the computing system 900 and/or machine-learned models 1035 can be located and used at the machine learning computing system 1000.

In some implementations, the machine learning computing system 1000 and/or the computing system 900 can train the machine-learned models 935 through use of a model trainer 1040. The model trainer 1040 can train the machine-learned models 935 and/or 1040 using one or more training or learning algorithms. One example training technique is backwards propagation of errors. In some implementations, the model trainer 1040 can perform supervised training techniques using a set of labeled training data. In other implementations, the model trainer 1040 can perform unsupervised training techniques using a set of unlabeled training data. The model trainer 1040 can perform a number of generalization techniques to improve the generalization capability of the models being trained. Generalization techniques include weight decays, dropouts, or other techniques.

In particular, the model trainer 1040 can train a machine-learned model 935 and/or 1140 based on a set of training data 1045. The training data 1045 can include, for example, manually labelled data in which the predetermined radar data and LIDAR data have an associated list of objects, each object including a determined size, location, orientation, and velocity. The model trainer 1040 can be implemented in hardware, firmware, and/or software controlling one or more processors.

The model trainer 1040 can train the proposed fusion model with a multi-task loss defined as a weighted sum of the detection loss, velocity loss on detection output, and velocity loss on late fusion output:

$$l^{total} = (l_{cis}^{det} + \alpha \cdot l_{reg}^{det}) + \beta \cdot (l_{cis}^{velo} + l_{reg}^{velo}) + \delta \cdot l_{reg}^{velo\_latefuse}$$

here $\alpha$, $\beta$, and $\delta$ are scalars. The system can use cross-entropy for all classification losses and smooth 1 for all regression losses. In some examples, the model trainer 1040 can use an Adam optimizer with batch normalization after every convolution layer and layer normalization after every fully-connected layer. For detection training, the model trainer 1040 can use hard negative mining.

The computing system 900 and the machine learning computing system 1000 can each include a communication interface 930 and 1050, respectively. The communication interfaces 930/1050 can used to communicate with one or more systems or devices, including systems or devices that are remotely located from the computing system 900 and the machine learning computing system 1000 A communication interface 930/1050 can include any circuits, components, software, etc. for communicating with one or more networks (e.g., 1300). In some implementations, a communication interface 930/1050 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 800 illustrates one example computing system 800 that can be used to implement the present disclosure. Other computing systems can be used as well. For example, in some implementations, the computing system 900 can include the model trainer 1040 and the training dataset 1045. In such implementations, the machine-learned models 1040 can be both trained and used locally at the computing system 900. As another example, in some implementations, the computing system 900 is not connected to other computing systems.

In addition, components illustrated and/or discussed as being included in one of the computing systems 900 or 1000 can instead be included in another of the computing systems 900 or 1000. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for generating perception and prediction data for autonomous vehicles, the method comprising:
   accessing radar sensor data for an area around an autonomous vehicle, the radar sensor data including a plurality of radar points;
   accessing LIDAR sensor data for the area around the autonomous vehicle;
   generating, using one or more machine-learned models, a fused representation of the area around the autonomous vehicle based on the radar sensor data and the LIDAR sensor data;
   determining, using the one or more machine-learned models, one or more objects in the area of the autonomous vehicle based on the fused representation;
   for a respective object in the one or more objects:
      determining a plurality of radar points from the radar sensor data that are associated with the respective object, each radar point having an associated velocity;
      generating, using a machine-learned model, a similarity score for each determined radar point;
      generating a weight associated with each radar point based, at least in part, on the similarity score; and
      calculating a predicted velocity for the respective object based on a weighted average of the velocities of the plurality of radar points determined to be associated with the respective object;
   generating a proposed motion plan based on the predicted velocity for the respective object; and
   transmitting vehicle motion controls to one or more vehicle control systems to implement the motion plan.

2. The computer-implemented method of claim 1, wherein the radar sensor data includes, for each radar point, a location of the radar point and a velocity associated with the radar point.

3. The computer-implemented method of claim 1, wherein the radar sensor data includes data from a plurality of cycles of the radar sensor.

4. The computer-implemented method of claim 1, wherein the LIDAR sensor data includes a plurality of LIDAR points, each LIDAR point having an associated location.

5. The computer-implemented method of claim 1, wherein the LIDAR sensor data includes data from a plurality of sweeps of the LIDAR sensor.

6. The computer-implemented method of claim 1, wherein generating, using one or more machine-learned models, a fused representation of the area around the autonomous vehicle based on the radar sensor data and the LIDAR sensor data further comprises:
   generating a voxel grid representation of the radar sensor data; and
   generating a voxel grid representation of the LIDAR sensor data.

7. The computer-implemented method of claim 6, wherein the voxel grid representation of the radar sensor data includes a plurality of voxels and each voxel is associated with a voxel occupancy value.

8. The computer-implemented method claim 7, wherein the voxel occupancy value for a respective voxel is based on a number of radar points that fall within the area associated with the respective voxels.

9. The computer-implemented method of claim 6, wherein generating, using one or more machine-learned models, a fused representation of the area around the autonomous vehicle based on the radar sensor data and the LIDAR sensor data further comprises:
   identifying, using the voxel grid representation of the radar sensor data as input to one or more machine-learned models, feature data for the radar sensor data; and
   identifying, using the voxel grid representation of the LIDAR sensor data as input to one or more machine-learned models, feature data for the LIDAR sensor data.

10. The computer-implemented method of claim 1, wherein generating, using one or more machine-learned models, a fused representation of the area around the autonomous vehicle based on the radar sensor data and the LIDAR sensor data further comprises:
   concatenating feature data associated with the radar sensor data and feature data associated with the LIDAR sensor data and associating the concatenated data with a corresponding point in the fused representation.

11. The computer-implemented method of claim 1, further comprising:
filtering the radar sensor data to remove radar points that have an associated velocity value below a predetermined threshold.

12. A computing system for generating perception and prediction data for autonomous vehicles, the system comprising:
one or more processors and one or more non-transitory computer-readable memories;
wherein the one or more non-transitory computer-readable memories store instructions that, when executed by the processor, cause the computing system to perform operations, the operations comprising:
accessing radar sensor data for an area around an autonomous vehicle, the radar sensor data including a plurality of radar points;
accessing LIDAR sensor data for the area around the autonomous vehicle;
generating, using one or more machine-learned models, a fused representation of the area around the autonomous vehicle based on the radar sensor data and the LIDAR data;
determining, using the one or more machine-learned models, one or more objects in the area of the autonomous vehicle based on the fused representation;
for a respective object in the one or more objects:
determining a plurality of radar points from the radar sensor data that are associated with the respective object, each radar point having an associated velocity;
generating, using a machine-learned model, a similarity score for each determined radar point;
generating a weight associated with each radar point based on the similarity score; and
calculating a predicted velocity for the respective object based on a weighted average of the velocities of the plurality of radar points determined to be associated with the respective object;
generating a proposed motion plan based on the predicted velocity for the respective object; and
transmitting vehicle motion controls to one or more vehicle control systems to implement the motion plan.

13. The computing system of claim 12, wherein determining a plurality of radar points from the radar sensor data that are associated with the respective object, each radar point having an associated velocity further comprises:
determining for each radar point in the plurality of radar points, a distance from the radar point to a point associated with the respective object; and
selecting one or more radar points based on the determined distance between each radar point and a point associated with the respective object.

14. The computing system of claim 13, wherein the point associated with the respective object is an estimated center of the object.

15. The computing system of claim 12, wherein the respective object has an estimated direction.

16. The computing system of claim 15, wherein generating a similarity score for each determined radar point further comprises:
generating for a radar point, a modified velocity value based on the estimated direction of the respective object and the velocity associated with the radar point.

17. The computing system of claim 16, wherein the modified velocity value is parallel to the estimated direction of the respective object.

18. The computing system of claim 12, wherein generating a weight associated with each radar point based on the similarity score further comprises:
normalizing the weights associated with the plurality of radar points.

19. An autonomous vehicle, comprising:
one or more processors; and
one or more non-transitory computer-readable media that collectively store instructions that, when executed by the one or more processors, cause the one or more processors to perform operations, the operations comprising:
accessing radar sensor data for an area around an autonomous vehicle, the radar sensor data including a plurality of radar points;
accessing LIDAR sensor data for the area around the autonomous vehicle;
generating, using one or more machine-learned models, a fused representation of the area around the autonomous vehicle based on the radar sensor data and the LIDAR data;
determining, using the one or more machine-learned models, one or more objects in the area of the autonomous vehicle based on the fused representation;
for a respective object in the one or more objects:
determining a plurality of radar points from the radar sensor data that are associated with the respective object, each radar point having an associated velocity;
generating, using a machine-learned model, a similarity score for each determined radar point;
generating a weight associated with each radar point based on the similarity score; and
calculating a predicted velocity for the respective object based on a weighted average of the velocities of the plurality of radar points determined to be associated with the respective object; and
generating a proposed motion plan based on the predicted velocity for the respective object; and
transmitting vehicle motion controls to one or more vehicle control systems to implement the motion plan.

* * * * *

UNITED STATES PATENT AND TRADEMARK OFFICE
CERTIFICATE OF CORRECTION

| | | |
|---|---|---|
| PATENT NO. | : 12,013,457 B2 | Page 1 of 1 |
| APPLICATION NO. | : 17/150590 | |
| DATED | : June 18, 2024 | |
| INVENTOR(S) | : Urtasun et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 666 days.

Signed and Sealed this
Twelfth Day of November, 2024

*Katherine Kelly Vidal*

Katherine Kelly Vidal
*Director of the United States Patent and Trademark Office*